United States Patent
Ward

(10) Patent No.: US 9,626,401 B1
(45) Date of Patent: *Apr. 18, 2017

(54) SYSTEMS AND METHODS FOR HIGH-SPEED SEARCHING AND FILTERING OF LARGE DATASETS

(71) Applicant: Moonshadow Mobile, Inc., Eugene, OR (US)

(72) Inventor: Roy W. Ward, Eugene, OR (US)

(73) Assignee: Moonshadow Mobile, Inc., Eugene, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/873,625

(22) Filed: Oct. 2, 2015

Related U.S. Application Data

(63) Continuation of application No. 13/733,890, filed on Jan. 4, 2013, now Pat. No. 9,171,054.

(60) Provisional application No. 61/583,130, filed on Jan. 4, 2012.

(51) Int. Cl.
*G06F 17/30* (2006.01)

(52) U.S. Cl.
CPC .. *G06F 17/30327* (2013.01); *G06F 17/30442* (2013.01)

(58) Field of Classification Search
CPC ............. G06F 17/2252; G06F 17/2258; G06F 17/30327; G06F 17/30442; G06F 17/30589; G06F 17/30625; G06F 17/30961; G06F 17/30985
USPC ....... 707/693, 713, 715, 716, 754, 791, 793, 707/795, 796, 797, 798, 800, 802, 803, 707/812; 711/117, 154
See application file for complete search history.

(56) References Cited

U.S. PATENT DOCUMENTS

| | | | |
|---|---|---|---|
| 5,276,868 A | 1/1994 | Poole | |
| 5,557,786 A * | 9/1996 | Johnson, Jr. | ...... G06F 17/30961 |
| 5,655,129 A | 8/1997 | Ito | |
| 5,710,915 A | 1/1998 | McElhiney | |

(Continued)

OTHER PUBLICATIONS

Acharya et al; Adaptive Algorithms for Cache-efficient Trie Search; ALENEX'99, LNCS 1619, pp. 296-311, Goodrich & McGeoch (Eds); Springer-Verlag (1999); cited in parent.

(Continued)

*Primary Examiner* — Greta Robinson
(74) *Attorney, Agent, or Firm* — David S. Alavi

(57) ABSTRACT

A data structure comprises a clump header table, an inline tree data structure, and one or more auxiliary data structures. Each clump header record includes an indicator of a location in the inline tree data structure of corresponding binary string segments. Clump header records or auxiliary header records include indicators of corresponding locations in the corresponding auxiliary data structure. Each auxiliary data structure can be altered without necessarily altering the inline tree or clump header table. A dedicated, specifically adapted conversion program generates the clump header file, the inline tree data structure, and the one or more auxiliary data structures. The data structure can be stored on any computer-readable medium, and can be read entirely into RAM to be searched (with or without filtering on one or more filter data fields). A dedicated, specifically adapted search and filter program is employed, which can list or enumerate the retrieved data records.

24 Claims, 10 Drawing Sheets

(56) References Cited

U.S. PATENT DOCUMENTS

| | | |
|---|---|---|
| 5,721,899 A | 2/1998 | Namba |
| 5,737,732 A | 4/1998 | Gibson et al. |
| 5,829,004 A | 10/1998 | Au |
| 5,978,797 A | 11/1999 | Yianilos |
| 6,012,057 A | 1/2000 | Mayer et al. |
| 6,175,835 B1 | 1/2001 | Shadmon |
| 6,341,280 B1 | 1/2002 | Glass et al. |
| 6,374,251 B1 | 4/2002 | Fayyad et al. |
| 6,499,033 B1 | 12/2002 | Vagnozzi |
| 6,560,610 B1 | 5/2003 | Eatherton et al. |
| 6,581,058 B1 | 6/2003 | Fayyad et al. |
| 6,654,760 B2 | 11/2003 | Baskins et al. |
| 6,675,171 B2 | 1/2004 | Tikkanen et al. |
| 6,721,723 B1 | 4/2004 | Gibson et al. |
| 6,728,732 B1 | 4/2004 | Eatherton et al. |
| 7,827,218 B1 | 11/2010 | Mittal |
| 8,977,656 B2 | 3/2015 | Ward et al. |
| 8,990,204 B1 | 3/2015 | Ward |
| 9,002,859 B1 | 4/2015 | Ward |
| 9,171,054 B1 * | 10/2015 | Ward .............. G06F 17/30589 |
| 2001/0042186 A1 | 11/2001 | Iivonen et al. |
| 2002/0035660 A1 | 3/2002 | Tikkanen et al. |
| 2002/0087510 A1 | 7/2002 | Weinberg et al. |
| 2003/0018620 A1 | 1/2003 | Vishnubhotla |
| 2003/0061189 A1 | 3/2003 | Baskins et al. |
| 2003/0061227 A1 | 3/2003 | Baskins et al. |
| 2003/0105745 A1 | 6/2003 | Davidson et al. |
| 2004/0059725 A1 | 3/2004 | Sharangpani et al. |
| 2004/0107184 A1 | 6/2004 | Longshaw |
| 2004/0111439 A1 | 6/2004 | Richardson et al. |
| 2004/0117396 A1 | 6/2004 | Avadhanam et al. |
| 2004/0133590 A1 | 7/2004 | Henderson et al. |
| 2004/0193619 A1 | 9/2004 | Venkatachary et al. |
| 2004/0205517 A1 | 10/2004 | Lampert et al. |
| 2004/0243576 A1 | 12/2004 | Shrivastava et al. |
| 2004/0267710 A1 | 12/2004 | Cotarmanac'h et al. |
| 2005/0027744 A1 | 2/2005 | Avadhanam et al. |
| 2005/0055351 A1 | 3/2005 | Barton et al. |
| 2005/0091223 A1 | 4/2005 | Shaw et al. |
| 2005/0171959 A1 | 8/2005 | Deforche et al. |
| 2005/0240604 A1 | 10/2005 | Corl et al. |
| 2005/0251331 A1 | 11/2005 | Kreft |
| 2006/0271540 A1 | 11/2006 | Williams |
| 2006/0282457 A1 | 12/2006 | Williams |
| 2006/0288024 A1 | 12/2006 | Braica |
| 2007/0192548 A1 | 8/2007 | Williams |
| 2007/0255748 A1 | 11/2007 | Ferragina et al. |
| 2008/0019317 A1 | 1/2008 | Vellanki et al. |
| 2008/0086464 A1 | 4/2008 | Enga |
| 2009/0077113 A1 | 3/2009 | Fidaali et al. |
| 2009/0138790 A1 | 5/2009 | Larcheveque et al. |
| 2010/0011125 A1 | 1/2010 | Yang et al. |
| 2010/0023515 A1 | 1/2010 | Marx |
| 2010/0057792 A1 | 3/2010 | Ylonen |
| 2010/0085223 A1 | 4/2010 | Hendrickson |
| 2010/0127902 A1 | 5/2010 | Schneider |
| 2010/0146004 A1 | 6/2010 | Sim-Tang |
| 2010/0185609 A1 | 7/2010 | Wright et al. |
| 2010/0281082 A1 | 11/2010 | Ylonen |
| 2010/0332561 A1 | 12/2010 | Prahlad et al. |
| 2011/0016153 A1 | 1/2011 | Atta et al. |
| 2012/0005239 A1 | 1/2012 | Nevin, Iii |
| 2012/0016908 A1 | 1/2012 | Leung et al. |
| 2012/0179699 A1 | 7/2012 | Ward et al. |
| 2015/0205814 A1 | 7/2015 | Ward et al. |

OTHER PUBLICATIONS

Allowance dated Feb. 27, 2015 in co-owned U.S. Appl. No. 13/326,326 now U.S. Pat. No. 9,002,859 (copy of allowance attached).

\* cited by examiner string table

...000 Smith
...001 Jones
...010 Doe

...010 John
...011 Mary

...101 Oak
...110 Main
...111 Elm

...111 Portland
...000 Eugene
...001 Corvallis

FIG. 5A supplementary table

...001 Street
...010 Boulevard
...011 Avenue
...100 Lane
...101 Road

FIG. 5B

| clumpID | Portland | Multnomah | OR | CONG/1 | OR/HOU/36 | OR/SEN/18 | 97201 | ... |

| clumpID | Eugene | Lane | OR | CONG/4 | OR/HOU/8 | OR/SEN/4 | 97405 | ... |

| clumpID | Ashland | Jackson | OR | CONG/2 | OR/HOU/5 | OR/SEN/3 | 97520 | ... |

FIG. 6A

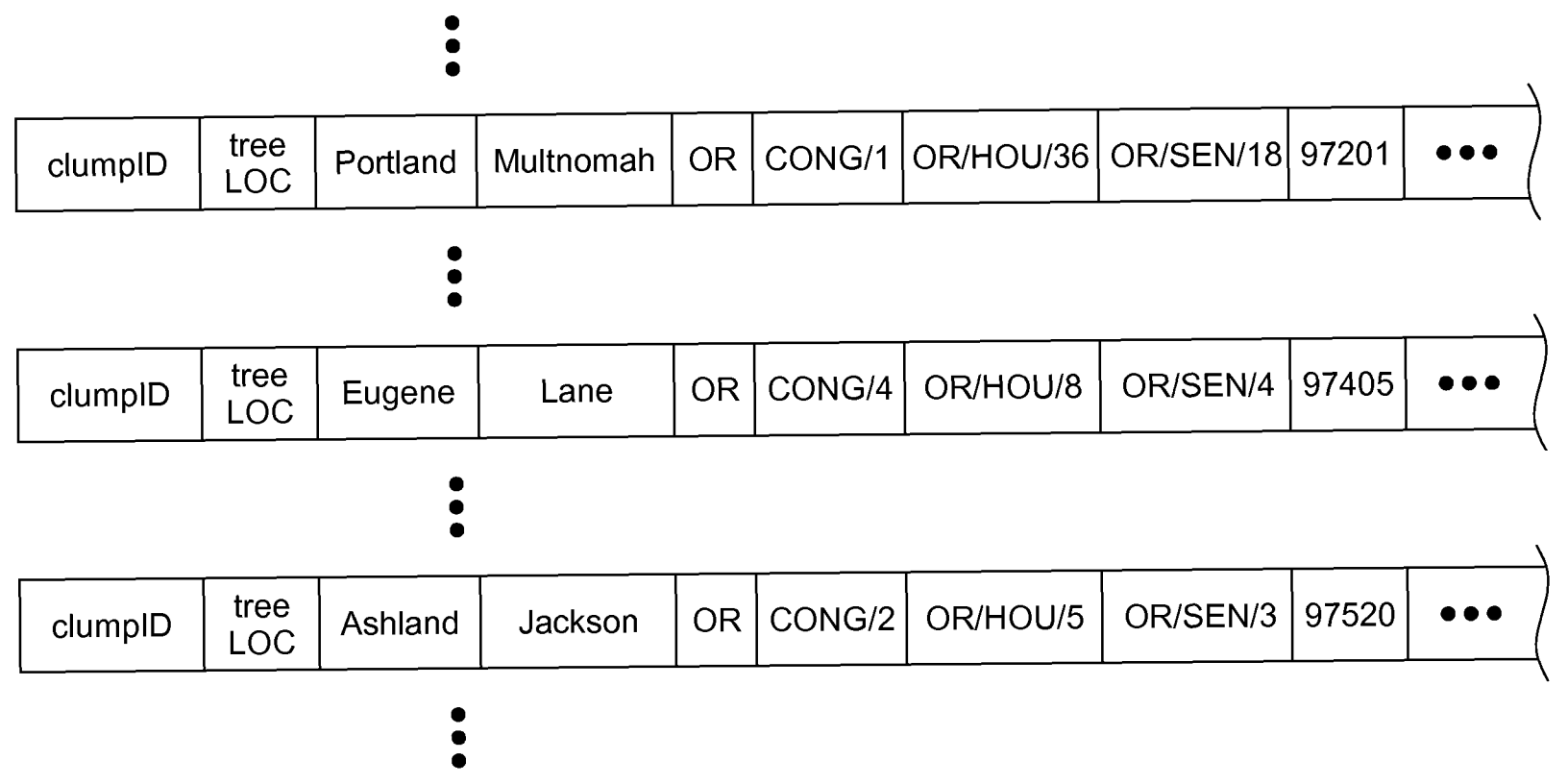

| clumpID | tree LOC | Portland | Multnomah | OR | CONG/1 | OR/HOU/36 | OR/SEN/18 | 97201 | ... |

| clumpID | tree LOC | Eugene | Lane | OR | CONG/4 | OR/HOU/8 | OR/SEN/4 | 97405 | ... |

| clumpID | tree LOC | Ashland | Jackson | OR | CONG/2 | OR/HOU/5 | OR/SEN/3 | 97520 | ... |

FIG. 6B

| clumpID | cum rec# | tree LOC | ... | Portland | Multnomah | OR | CONG/1 | OR/HOU/36 | OR/SEN/18 | 97201 | ... |
|---|---|---|---|---|---|---|---|---|---|---|---|

| clumpID | cum rec# | tree LOC | ... | Eugene | Lane | OR | CONG/4 | OR/HOU/8 | OR/SEN/4 | 97405 | ... |
|---|---|---|---|---|---|---|---|---|---|---|---|

| clumpID | cum rec# | tree LOC | ... | Ashland | Jackson | OR | CONG/2 | OR/HOU/5 | OR/SEN/3 | 97520 | ... |
|---|---|---|---|---|---|---|---|---|---|---|---|

SYSTEMS AND METHODS FOR HIGH-SPEED SEARCHING AND FILTERING OF LARGE DATASETS

BENEFIT CLAIMS TO RELATED APPLICATIONS

This application is a continuation of U.S. non-provisional application Ser. No. 13/733,890 filed Jan. 4, 2013 in the name of Roy W. Ward (now U.S. Pat. No. 9,171,054), which in turn claims benefit of U.S. provisional App. No. 61/583,130 filed Jan. 4, 2012 in the name of Roy W. Ward, both of said applications being hereby incorporated by reference as if fully set forth herein.

BACKGROUND

The field of the present invention relates to electronic data search and retrieval. In particular, systems and methods are disclosed herein for high-speed searching and filtering of large datasets.

This application related to subject matter disclosed in (i) U.S. provisional App. No. 61/424,063 filed Dec. 17, 2010 in the name of Roy W. Ward (the '063 application), (ii) U.S. provisional App. No. 61/431,654 filed Jan. 11, 2011 in the names of Roy W. Ward and David S. Alavi (the '654 application), and (iii) U.S. non-provisional application Ser. No. 13/326,326 filed Dec. 15, 2011 in the name of Roy W. Ward (the '326 application; now U.S. Pat. No. 9,002,859). Each of said applications is hereby incorporated by reference as if fully set forth herein, and are hereinafter referred to collectively as the "inline tree applications."

Many situations exist in which very large amounts of data are generated or collected (e.g., $10^4$, $10^6$, $10^8$, or more data records, each comprising multiple data fields). For data in a dataset to be of any practical use, indicia representing the dataset are stored according to a data structure arranged so that particular pieces of information can be located and retrieved from the dataset. In the pre-digital past, such data structures often comprised printed alphanumeric indicia on suitable media (often including an accompanying printed index), and data search and retrieval were manual functions performed by humans. The introduction of electronic data storage and search capabilities around the middle of the last century revolutionized the ability to store large datasets, and to search for and retrieve specific information from those stored datasets.

Today, alphanumeric indicia representative of a dataset are typically stored according to digital, electronic data structures such as an electronic spreadsheet or an electronic relational database. A spreadsheet (also referred to as a flat file database) can be thought of as a single table with rows and columns, with each row corresponding to a specific data record, and with each column corresponding to a specific data field of that data record. In a simple example (one that will be used repeatedly within the instant specification), each data record can correspond to a registered voter in a dataset of all registered voters in a particular state, e.g., Oregon. The data fields in each data record can include, e.g., last name, first name, middle name or initial, age, gender, marital status, race, ethnicity, religion, other demographic information, street address (likely divided into multiple data fields for street number, street name, and so on), city, state, zip code, party affiliation, voting history, county, U.S. house district, state senate or house district, school district, other administrative districts, and so on.

A relational database typically comprises multiple tables, each comprising multiple records with multiple fields, and relations defined among various fields in differing tables. In the registered voter example given above, a "voter" table might include voter records with name and demographic information in corresponding fields, and an "address" table might include address records that includes street address and district information in corresponding fields. A field in the voter table can include a pointer to the corresponding address in the address table, defining a one-to-many relationship between each address and one or more corresponding voters. Other tables and relationships can be defined (including many-to-many relationships and so called pivot tables to define them).

Electronic spreadsheets and electronic relational databases have become standard methods for storing digital datasets. They offer nearly unlimited flexibility in arranging the data, for updating the data, for adding new data, and for sorting, searching, filtering, or retrieving data. However, it has been observed that for a very large dataset (e.g., $>10^6$ or more records, or even as few as $>10^4$ or $>10^5$ records), spreadsheets and databases tend to become unwieldy to store, access, and search. In particular, search and retrieval of information from such a large electronic dataset can become so slow as to render it essentially useless for certain data retrieval applications.

The applications cited above (hereinafter referred to collectively as the "inline tree applications") disclose alternative systems and methods for high-speed searching and filtering of large datasets. In contrast to conventional spreadsheets and relational databases, the dataset is stored as a specialized, highly compressed binary data structure that is generated from a more conventional data structure using a dedicated, specifically adapted conversion program, and that is searched and filtered using a dedicated, specifically adapted search and filter program. The inline tree data structure typically can be stored in a binary file that occupies less than about 1 to 2 bytes per field per record on a digital storage medium (e.g., a dataset of one million records having 100 fields each can be stored in less than about 100 to 200 MB). The significant size reduction relative to a spreadsheet or a relational database (often greater than 10× reduction) can often enable the entire dataset to be loaded into random access memory for searching and filtering, significantly increasing the speed of those operations. The small size and contiguous arrangement of the inline tree data structure also speeds search and filter processes, so that a large dataset (e.g., $10^6$, $10^8$, or more data records each including over 100 data fields) can be searched and filtered in less than about 150 to 500 nanoseconds per record per processor core.

As noted above, inline tree data structures have a highly specialized structure that must be generated by a dedicated, specially adapted conversion program, and must be search and filtered by a dedicated, specially adapted search and filter program. Unlike a spreadsheet or a relational database, an inline tree data structure cannot be readily modified to include new or updated data. For new or replacement data to be inserted into existing data fields, or to add entire new records to the dataset, the conversion program must be executed to generate an entirely new inline tree structure. For new data fields to be added to the dataset, the conversion program must be adapted to accommodate those new fields before generating a new inline tree structure, and the search and filter program must be adapted to accommodate the new inline tree data structure. As noted in the inline tree applications, this loss of flexibility and updateability is the price paid to obtain the small size and speedy searching of the inline tree data structure.

It would be desirable to provide systems and methods that enable high-speed search and retrieval of information from large electronic datasets that substantially exceed search and retrieval speeds from conventional electronic data structures (e.g., conventional spreadsheets and databases), so as to enable data search and retrieval applications that are too slow for practicable use with those conventional data structures, while also enabling alteration or updating of data strings in certain existing data fields or enabling addition of new data fields.

SUMMARY

Electronic indicia of a data structure comprise a clump header table, an inline tree data structure, and one or more auxiliary data structures. A computer-implemented method generates the electronic indicia from a conventional data structure. The clump header table, the inline tree data structure, and the one or more auxiliary data structures are stored on a computer-readable storage medium operatively coupled to the one or more computer processors. Each clump header record includes an indicator of a location in the inline tree data structure of corresponding binary string segments; clump header records or auxiliary header records include indicators of corresponding locations in the corresponding auxiliary data structure. Each of the one or more auxiliary data structures comprises electronic indicia of a corresponding auxiliary set of data fields, which can include (i) one or more of the defined data fields or (ii) one or more additional data fields that are not among the defined data fields. The electronic indicia of each one of the one or more auxiliary data structures comprise a corresponding set of auxiliary binary string segments, a corresponding auxiliary inline tree data structure, or a corresponding set of auxiliary alphanumeric string segments.

Each auxiliary data structure can be altered without necessarily altering the inline tree or clump header table. A dedicated, specifically adapted conversion program generates the clump header file, the inline tree data structure, and the one or more auxiliary data structures. The data structure can be stored on any computer-readable medium, and can be read entirely into RAM to be searched (with or without filtering on one or more filter data fields). A dedicated, specifically adapted search and filter program is employed, which can list or enumerate the retrieved data records.

Objects and advantages pertaining to electronic data search and retrieval may become apparent upon referring to the exemplary embodiments illustrated in the drawings and disclosed in the following written description or appended claims. This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A and 5B illustrate schematically examples of tables establish correspondence between binary data strings in the data structure of FIG. 4 and alphanumeric data strings in the dataset of FIG. 1.

FIGS. 6A and 6B illustrate schematically examples of clump data records of a clump header table.

FIG. 8B illustrates schematically another exemplary arrangement of binary data strings in the inline tree data structure of FIG. 4.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

In many examples of an electronic dataset, the data comprise a multitude of alphanumeric data records, and each one of those data records in turn comprises a corresponding alphanumeric data string in each of multiple data fields. In many instances, the dataset is hierarchical and can be organized according to a multilevel tree structure. Each node of such a tree structure typically represents a one-to-many relationship between (i) a single value (or perhaps a single subrange of values) in one or more data fields at one level of the tree and (ii) one or more values or subranges in one or more other data fields at the next level of the tree.

A dataset of all registered voters in the state of Oregon will be used repeatedly as an example in the present disclosure. The systems and methods disclosed or claimed herein are not, however, limited to that dataset or to datasets of that general type, but can be applied to any dataset in which the data can be arranged according to data structures exemplified herein. The Oregon registered voter dataset includes records for about $1.9 \times 10^6$ individual voters at about $1.0 \times 10^6$ distinct addresses. There are several dozen possible data fields for each voter and about 100 possible data fields for each address. A conventional spreadsheet or flat file database containing the Oregon registered voter dataset is about 2 GB (gigabytes) in size when stored on a computer hard disk.

Figure 1:
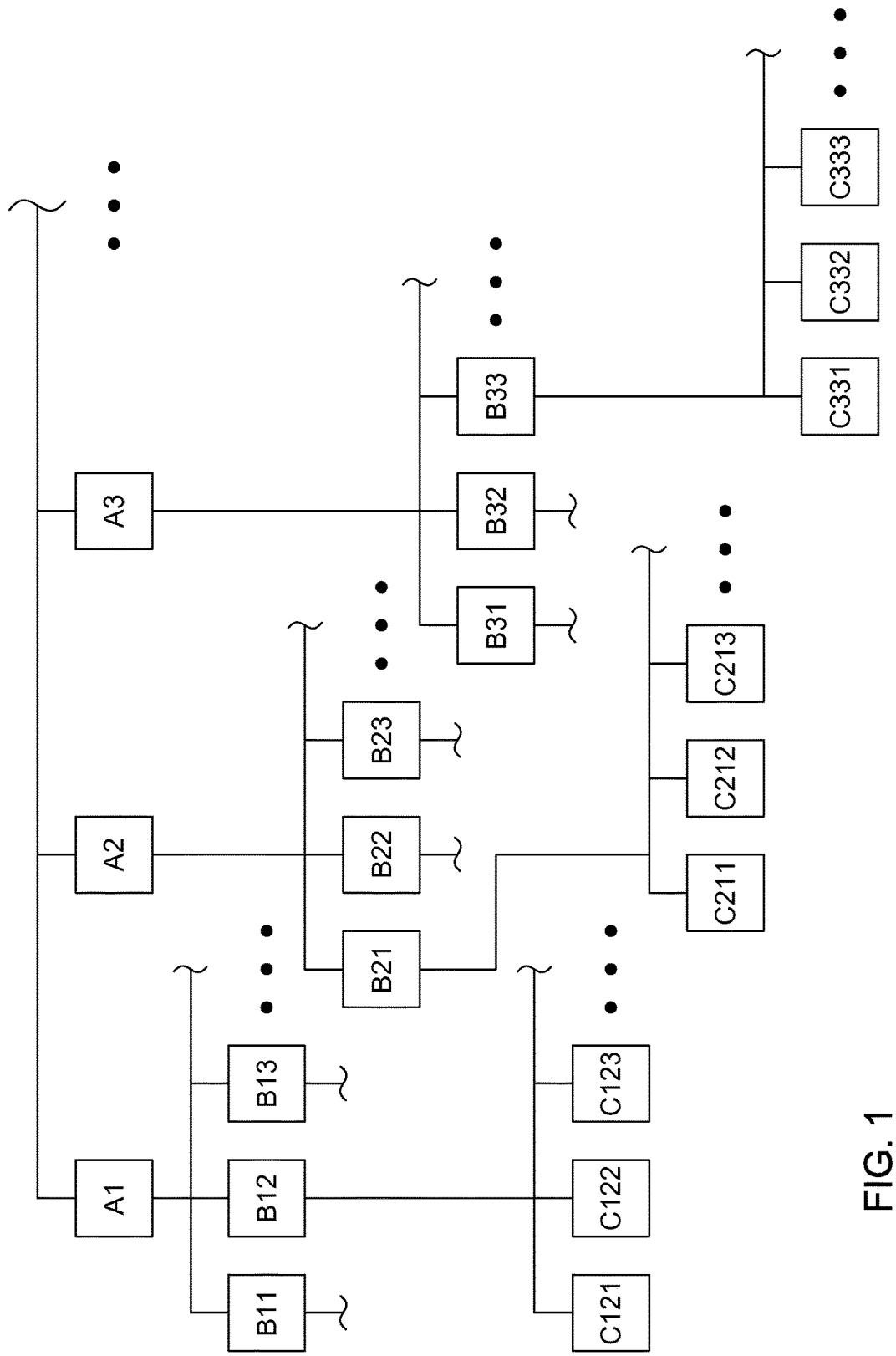
FIG. 1 illustrates schematically a hierarchical arrangement of a generic dataset.

FIG. 1 illustrates schematically an exemplary generic tree structure for organizing data into a three-level hierarchy (levels designated by A, B, and C in FIG. 1). One example of a data hierarchy for the registered voter example might comprise streets (A1, A2, A3, etc.), addresses (B11, B12, B13, etc. on street A1; B21, B22, B23, etc. on street A2; and so on for other addresses Bxy on other streets Ax), and voters (voters C111, C112, C113, etc. at address B11; voters C121, C122, C123, etc. at address B12; and so on for other voters Cxyz at other addresses Bxy). A terminal node of the tree structure (i.e., at the end of a branch; Cxyz in the example of FIG. 1, or a single voter in the voter dataset) can be referred to as a "leaf node" or simply a "leaf," and corresponds to an individual data record within the dataset. Each data record comprises data strings in corresponding data fields that designate the leaf node and its associated attributes, and can also include data strings in corresponding data fields that designate the higher level nodes to which the leaf node is connected (and attributes associated with those higher level nodes). A hierarchical data tree can include as many levels as needed or desired (which can vary by branch of the tree), and can include as many nodes as needed or desired at any given level. In a further example, the entire hierarchical data arrangement of FIG. 1 can itself constitute a terminal node or intermediate nodes of a larger tree structure (discussed further below). In addition to the registered voter example, other specific examples of data that can be advantageously organized according to hierarchical tree can include: census data, e.g., organized by state (A), county (B), tract (C), census block (D), and record (E); sales data, e.g., organized by customers (A), orders (B), and payments (C); or geopolitical data, e.g., organized by continents (A), countries (B), states or provinces (C), and cities (D). Those and any other suitable examples shall fall within the scope of the present disclosure or appended claims.

For convenience of description in the present specification and claims, stored electronic indicia and the underlying data they represent may be referred to interchangeably. It should be noted that the data themselves are an abstraction, and that the representative indicia are the objects that are electronically stored, handled, arranged in a data structure, searched, retrieved, or otherwise manipulated in the methods and systems disclosed or claimed herein. Use of the term "data" in the present disclosure shall be understood to indicate the representative indicia if appropriate in a given context.

One conventional electronic data structure that can be employed to store the data represented in FIG. 1 is an electronic spreadsheet in which electronic indicia representing the data are organized into rows and columns (i.e., a flat file database, with "rows" and "columns" defined in the usual way). Several rows of such a spreadsheet are illustrated schematically in FIG. 2. Each row of the spreadsheet corresponds to one data record of the dataset, hence to one of the "leaf nodes" of the tree of FIG. 1 (e.g., Cxyz). The columns of the spreadsheet correspond to data fields Cxyz-F1, Cxyz-F2, etc. for data record Cxyz, corresponding data fields Bxy-F1, Bxy-F2, etc. for node Bxy (the corresponding node at the next higher level in the hierarchy), and data fields Ax-F1, Ax-F2, etc. for node Ax (the corresponding node two levels higher in the hierarchy). Additional fields would be required for additional levels. Note that there is space reserved in the spreadsheet for every possible data field for every data record, regardless of whether a given data record has data in that field. Note also that data for the higher-level nodes are repeated in each data record that corresponds to a leaf node connected to that higher-level node.

Figure 2:
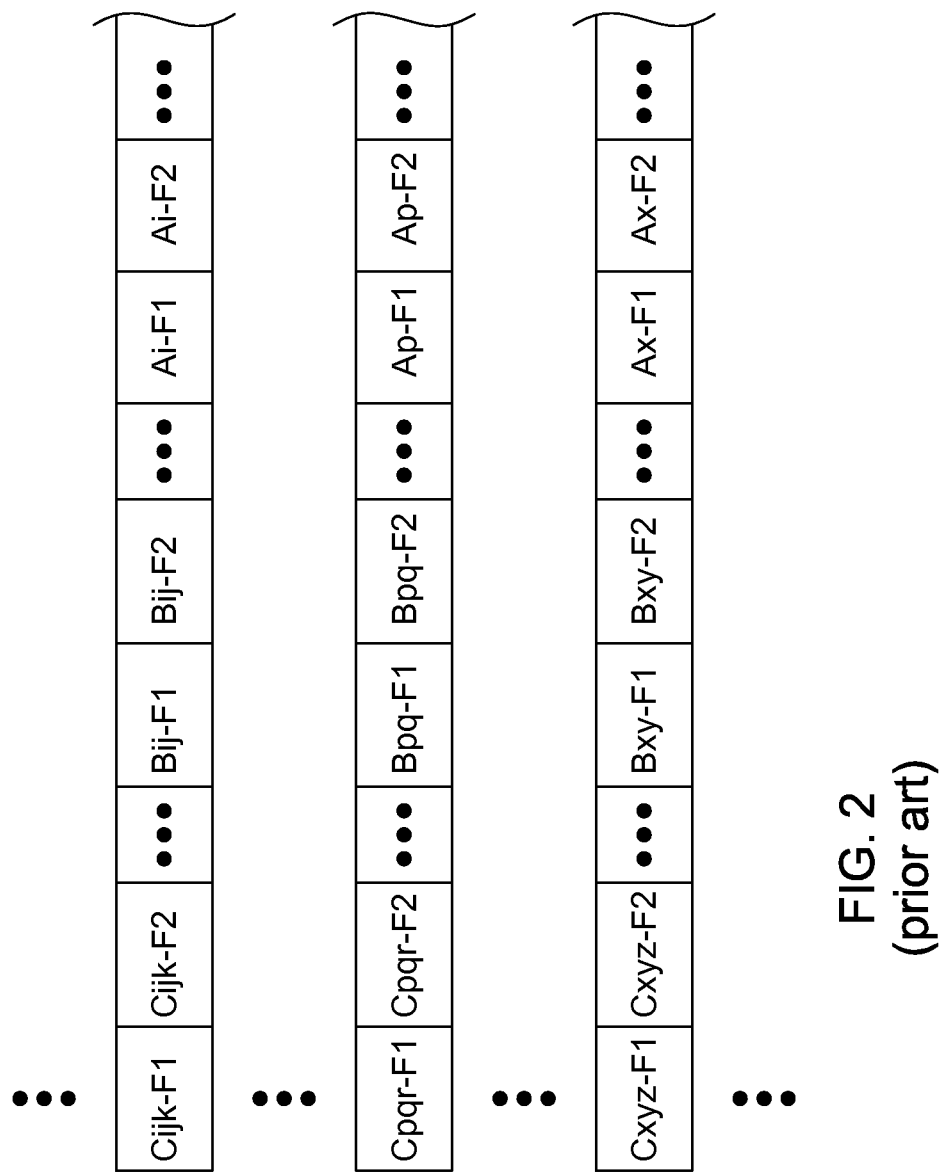
FIG. 2 illustrates schematically the arrangement of indicia corresponding to the dataset of FIG. 1 in an exemplary conventional flat file database.
Figure 3:
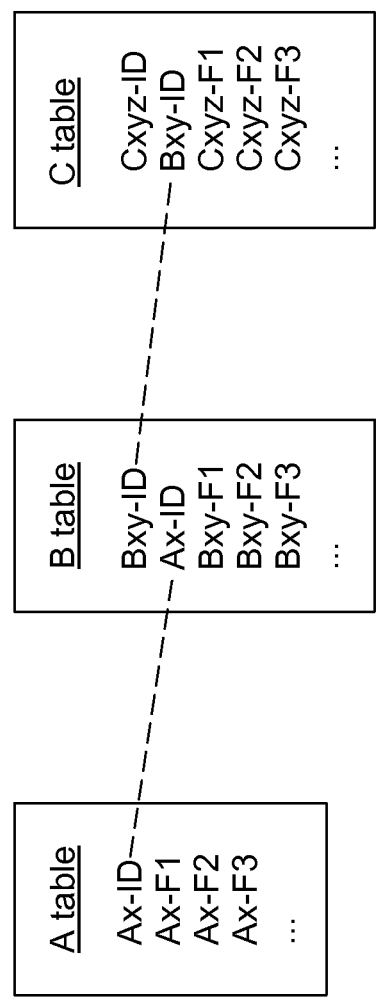
FIG. 3 illustrates schematically the arrangement of indicia corresponding to the dataset of FIG. 1 in an exemplary conventional relational database.

Another conventional electronic data structure that can be employed to store the data represented in FIG. 1 is an electronic relational database in which electronic indicia representing the data are organized into tables, as illustrated schematically in FIG. 3. Each table record in the "C" table represents a corresponding "leaf node" Cxyz and includes an identifier field Cxyz-ID, corresponding data fields Cxyz-F1, Cxyz-F2, etc., and a field for an identifier Bxy-ID of the corresponding node Bxy in the next higher level. Each table record in the "B" table represents a corresponding node Bxy and includes a field for the identifier Bxy-ID, corresponding data fields Bxy-F1, Bxy-F2, etc., and a field for an identifier Ax-ID of the corresponding node Ax in the next higher level. Each table record in the "A" table represents a corresponding node Ax and includes a field for the identifier Ax-ID and corresponding data fields Ax-F1, Ax-F2, etc. Each table diagram of FIG. 3 is understood to represent multiple different table records of the illustrated contents, as is understood by those skilled in database administration. The dotted lines connecting certain fields of different tables represent one-to-many relationships established within the relational database structure (e.g., one Ax to one or more Bxy's; one Bxy to one or more Cxyz's). Note that, as with the spreadsheet data structure of FIG. 2, space is reserved for every possible field for every data record. However, unlike the spreadsheet example of FIG. 1, data fields common to multiple data records need not be stored repeatedly for every leaf node. For example, the relationship between the Bxy-ID fields in the "B" and "C" tables enables storage of each of the Bxy-Fi fields only once, in the "B" table. The example of FIG. 3 is a relatively simple example of a relational database structure that includes only one-to-many relationships; more complicated examples might include more tables and many-to-many relationships that require so-called "pivot tables."

As noted above, conventional electronic data structures, e.g., spreadsheets and databases, offer great flexibility in terms of adding, removing, or modifying data records, establishing relationships between data fields in different records, and enabling a wide variety of sorts, searches, filters, or queries of the dataset. However, to provide such flexibility, the data structures become quite large and increasingly inefficient as the number of records in the dataset increases, partly due to the data required to define the data structure (i.e., "overhead") and partly due to space reserved for data fields that are empty. To boost speed, relational databases often include search indices, but those further increase the overall size of the data structure. The significant fraction of the impact of the large size of the data structure on the speed at which that structure can be sorted or searched arises from the manner in which large data structures are handled by the computer or server.

In typical use, only a portion of a large dataset can be loaded into the random-access memory (RAM) of a computer or server. A significant fraction of the time required to execute a sort or search of a large dataset is taken up by locating a needed segment of the dataset stored on a disk and pulling that segment into RAM and then into the processor's memory registers for processing, as opposed to the actual processing time once the data is in the processor registers. That sequence must be successively repeated until the entire dataset has been processed. Even worse, in many instances a given segment of the dataset is pulled into RAM more than once during each search operation. One reason for this lies in the way that data is typically handled by a computer processor. In typical conventional computer processors, data is retrieved into RAM or into a memory cache on the processor in fixed-size segments (e.g., 512 bytes into RAM, or 64 bytes into the cache). To retrieve a particular data field during a search operation, for example, the processor retrieves such a segment of the data that includes the desired field, but that typically also contains other data fields that are not of interest at that time. However, in the course of the entire search operation, it is likely that those other fields will be needed. If so, then the same segment of the data must be retrieved again, perhaps multiple times, to eventually retrieve all of the data fields in that segment.

Figure 4:
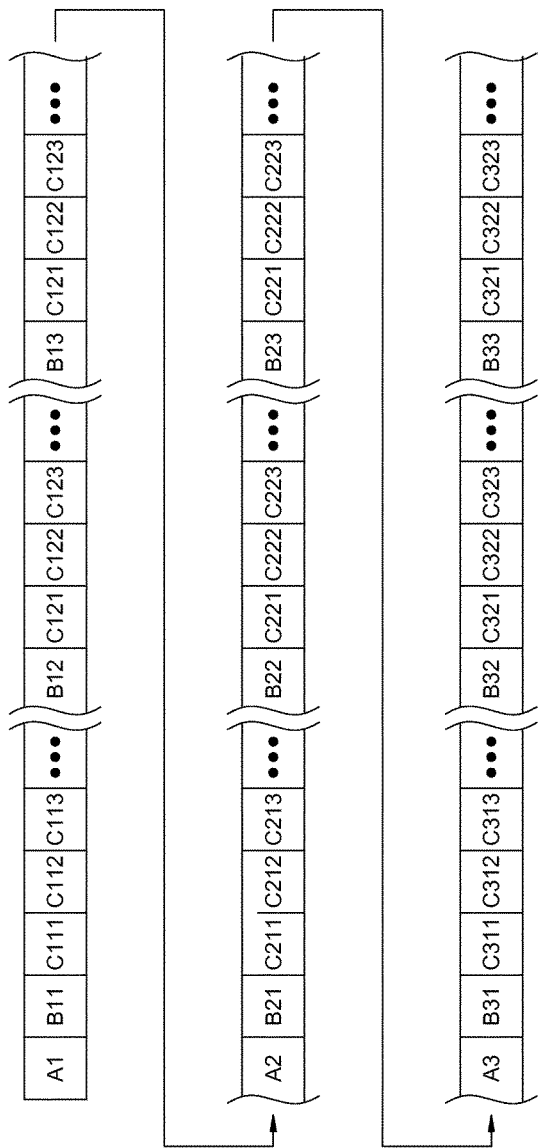
FIG. 4 illustrates schematically the arrangement of indicia corresponding to the dataset of FIG. 1 in an exemplary inline tree binary data structure according to the present disclosure.

To significantly speed up certain search, sort, or filter operations on a large dataset, alternative data structures have been developed; some examples of such alternative data structures are disclosed in the inline tree applications incorporated above. Such data structures can be illustrated schematically as shown in FIG. 4. As disclosed in the inline tree applications, among the objectives of the data structure of FIG. 4 are (i) to enable dramatic reduction in the overall size of the stored data structure (among other reasons, to allow it to be stored in RAM in its entirety, even if it includes millions or tens of millions of records or more) and (ii) to reduce the number of times a given segment of the data is retrieved from RAM into the processor cache or registers (preferably reduced to a single such retrieval per data segment). For a dataset having a million records of 100 fields each, size reductions by factors of about 5 to 10 or more can be achieved and have been observed, relative to the same dataset in a conventional data structure. For simple search, sort, or filter operations on that dataset, speed enhancements by factors of about 5 to 100 or more can be achieved and have been observed, relative to similar operations performed on the same dataset in a conventional data structure.

A further objective of the inline tree data structure of FIG. 4 can include significant reduction of the number of decisions points that must be resolved by a computer processor in the course of a search, filter, or retrieval operation performed on the dataset. Some arrangements of binary indicia of the dataset, employed to reduce the size of the data structure stored according to the disclosure of the '063 and '326 applications, require the computer processor to make numerous decisions to correctly interpret the series of bytes that make up the stored binary indicia. In datasets encoded according to the disclosure of the '654 application, size reductions are achieved in ways that require fewer decisions to be made by the computer processor, resulting in further speed gains over those disclosed in the '063 and '326 applications.

The data structure of FIG. 4 can be referred to as an "inline tree" data structure in which the branches and leaves of the tree of FIG. 1 are separated and arranged sequentially. There is no row/column arrangement as in a spreadsheet, nor is there any table arrangement as in a relational database. The data structure of FIG. 4 can be regarded as a single, continuous string of binary indicia representing a single line of characters or digits; a preferred format is a single string of binary digits, as will be explained further below. Within the binary indicia, binary fields represent the alphanumeric data fields in the underlying dataset in a way that reduces their size. Data fields are also arranged so as to increase the likelihood (i) that when one data segment is pulled into the processor cache for processing, the next segments to be processed have been pulled in along with it, and (ii) that all fields in that segment will be processed after it is first pulled into the processor cache, so that it does not need to be pulled into the processor cache again.

In the hierarchical data of FIG. 1, the data fields Ax-F1, Ax-F2, etc. can be referred to as first-level fields. Each node Ax can be defined by specifying, for each data field Ax-Fi, a subrange of data strings (equivalently, data values) that appear in that field in one or more data records. Note that a given subrange can comprise a single string, or a null string (i.e., no string stored in the field). Each node Ax therefore corresponds to a first-level subset of data records in the dataset, wherein the first-level subset includes only those data records for which the data string of each first-level data field Ax-Fi falls within the corresponding subrange. Similarly, each of the data fields Bxy-F1, Bxy-F2, etc. can be referred to as second-level fields. Each node Bxy can be defined by specifying, for each field Bxy-Fi, a subrange of data strings (equivalently, data values) that appear in that field in one or more data records (again, a given subrange can comprise a single string or a null string). Each node Bxy therefore corresponds to a second-level subset of data records within the corresponding first-level subset, wherein the second-level subset includes only those data records for which the data string of each second-level data field Bxy-Fi falls within the corresponding subrange. The foregoing description can be generalized to third-level data field(s) and data record subset(s), fourth-level data field(s) and data record subset(s), and so on.

The general arrangement of the inline tree data structure is illustrated schematically in FIG. 4. Each block in the diagram corresponds to a substantially contiguous binary string, each of which represents one or more data fields that in turn correspond to the branch nodes or leaf nodes of the underlying data (FIG. 1). For example, the binary strings labeled Ax (i.e., A1, A2, A3, etc.) include strings representing the values in the data fields Ax-F1, Ax-F2, Ax-F3, etc. for the corresponding first-level subsets of the data records. Similarly, the binary strings labeled Bxy include strings representing the values in the data fields Bxy-F1, Bxy-F2, etc., for the corresponding second-level subsets of the data records, and the binary strings labeled Cxyz include strings representing the values in the data fields Cxyz-F1, Cxyz-F2, etc. for each corresponding data record.

The binary strings Ax, Bxy, and Cxyz can be arranged in the inline tree so that each first-level subset of data records is represented by binary indicia that comprise a substantially contiguous first-level binary string segment, e.g., binary strings A1, B1y, and C1yz together form a substantially contiguous first-level binary string segment that represents a corresponding first-level subset of data records, binary strings A2, B2y, and C2yz together form another substantially contiguous first-level binary string segment that represents a different corresponding first-level subset of the data records, and so on. Each binary string Ax acts as a header for its corresponding substantially contiguous first-level binary string segment.

Within each first-level binary string segment (whether contiguous or not), the binary strings Bxy and Cxyz are arranged in the inline tree so that each second-level subset of data records is represented by binary indicia that comprise a substantially contiguous second-level binary string segment, e.g., binary strings B11 and C11z together form a substantially contiguous second-level binary string segment that represents a corresponding second-level subset of data records, binary strings B23 and C23z together form another substantially contiguous second-level binary string segment that represents a different corresponding second-level subset of the data records, and so on. Each binary string Bxy acts as a header for its corresponding substantially contiguous second-level binary string segment. The effect of the contiguous arrangement of the second-level binary string segments (and the first-level binary string segments, in some instances) is discussed further below.

Several techniques can be employed to drastically reduce the computer memory required to store the inline tree data structure of FIG. 4. As discussed further below, that size reduction leads to significantly faster search and filter operations on the dataset, as well as being desirable in its own right. However, some size reduction techniques require more decision-making than others by a computer processor executing a search, filter, or retrieval operation. Combining size reduction with decision reduction (according to the disclosure of the '654 application) yields speed gains beyond those achieved by size reduction alone.

A first technique disclosed in the inline tree applications for dataset size reduction includes substitution of a numerical index for each alphanumeric string stored in a data field (i.e., string indexing, sometimes referred to in computer science as string interning). The data in the fields Ax-Fi, Bxy-Fj, and Cxyz-Fk are conventionally represented by alphanumeric data strings, i.e., letters and numbers, and the data structures are arranged to store in each field any possible alphanumeric string up to a maximum permitted character length. Instead, to achieve significant size reduction, the dataset is analyzed and every unique alphanumeric string that actually occurs in the dataset is identified, enumerated, and stored (only once) in a master string table of any suitable type or format. An example is illustrated schematically in FIG. 5A, in which the enumeration is via a four-byte index (only the last three bits of each index are shown), enabling enumeration of up to $2^{32} \approx 4.3 \times 10^9$ different alphanumeric strings.

In the registered voter example, strings might include every first, middle, or last name, every street name, every city, county, or state name, every party affiliation, every district name, and many dozens of other voter attributes. In an actual dataset of over $1.9 \times 10^6$ registered voters (each with several dozen possible attributes) and about $10^6$ addresses (each with about 100 possible attributes) in the state of Oregon, the master string table includes only about 300,000 unique entries (actually slightly less). In the inline tree structure, instead of storing binary indicia that represent alphanumeric strings in the conventional way (e.g., requiring one byte per character plus overhead, or at least 33 bytes per up-to-32-character string), the corresponding four-byte numerical index is stored instead, reducing the space required for storing those fields by about a factor of 8. Another advantage of using a string table is that an arbitrary upper limit on the size of the strings need not be imposed. Arbitrarily long strings can be included in the string table without affecting the size of the inline tree data structure.

The string index technique can be further exploited for certain data fields in which only a very limited set of unique alphanumeric strings occur. For example, there are only limited choices for the type of street that appears in a street name, e.g., Street, Boulevard, Avenue, Lane, Road, etc. That field can be replaced by a one-byte index in the inline tree data structure (allowing indexing of up to 256 such strings; only the last three bits are shown) and a corresponding supplementary string table (illustrated schematically in FIG. 5B). Another example is party affiliation, which can also be replaced by a one byte index in the inline tree data structure (currently there are fewer than 256 recognized political parties) and a corresponding supplementary string table. Other examples include gender, marital status, street direction, and so on. Any suitable index size or combination of index sizes can be employed (e.g., one-byte, two-byte, three-byte, etc.; need not be restricted to a number of whole bytes, i.e., fractional bytes could be used).

Using a master string table and storing a binary index in the inline tree data structure, it is still possible to store any possible alphanumeric string (up to a specified maximum length). Storing the alphanumeric string only once (in the master string table) and storing the corresponding binary indices in the inline tree data structure results in substantial reduction of the size of resulting data file. It should be noted that string indexing can be implemented to reduce the size of data structures other than the inline tree data structure of FIG. 4. In particular, string indexing can be employed (alone or in combination with other size-reducing techniques, including those disclosed herein) to reduce the size of an inline data structure that is not necessarily arranged according to a hierarchical tree organization scheme, or to reduce the size of a conventional flat file or relational database, or other data structure. String indexing is employed in the exemplary inline tree data structures of the inline applications.

A second technique disclosed by the inline tree applications for dataset size reduction exploits the overlap properties of various attributes in the dataset. In the registered voter example, there are numerous address-related attributes (about 100) that are geographically constrained. These include attributes such as congressional district, state house and senate districts, school, water, or other administrative districts, zip code, county, city, ward, precinct, and so on. Assuming 100 attributes and an average of 10 alternatives per attribute (a conservative estimate), then there are about $10^{100}$ possible combinations of those attributes. However, many of those combinations include mutually exclusive combinations, e.g., an address in a state senate district in the northeast corner of the state cannot also lie within in a school district in the southwest corner of the state, or an address in a county in the southeast corner of the state cannot also lie within a city in the northwest corner of the state. In a specific example, analysis of the registered voter dataset for Oregon reveals that only about 7000 unique combinations of about 100 address-related attributes actually occur among the roughly $10^6$ unique addresses in the dataset, which affords another opportunity for massively reducing the size of the inline tree data structure of FIG. 4. Each of those combinations shall be referred to herein as an "attribute clump," "record clump," "data clump," or simply as a "clump." Note that a given clump might include a "null" entry for one or more of the clumped attributes.

Attribute clumping enables the substitution into the inline tree data structure (of the '063 and '326 applications) of a single clump index per address (e.g., two-byte, four-byte, or other suitable size) to replace alphanumeric strings (e.g., 33 bytes each) or four-byte indices (if the numerical string index technique described above has been implemented) in the nearly 100 data fields per address. A "clump table" can be employed to store the correspondence between the clump index (which can be referred to as a composite data string, because one data string takes the place of a combination of multiple data field values; the clump index can be any suitable size) and the specific alphanumeric strings associated with the fields of that clump (exemplary partial entries, i.e., clump data records, in such a clump table are illustrated schematically in FIG. 6A). The resulting overall size reduction of the data structure can be enormous (e.g., a reduction of over 3 GB out of about 3.5 GB for a dataset including 100 32-character alphanumeric fields for $10^6$ addresses, or a reduction of about 400 MB out of about 600 MB for a dataset including 100 4-byte-indexed fields, as described above, for $10^6$ addresses).

Alternatively, the clump index field can be omitted from the inline tree data structure entirely, as disclosed in the '654 application. The clump table can be adapted (e.g., as in FIG. 6B) to act as a clump header table by including in each clump data record an indicator of the location in the inline tree structure of the corresponding binary strings for data records sharing the clumped data strings (e.g., the "tree LOC" field shown in FIG. 6B). Although a "clumpID" field is shown in FIG. 6B, it is not strictly necessary in this embodiment. In an inline tree data structure arranged according to the disclosure of the '654 application (e.g., with binary strings arranged as in FIG. 7), before the inline tree is generated, certain data fields are selected to be made available as possible search filter criteria, and only those fields are represented by corresponding binary indices in the binary strings of the inline tree data structure.

In some examples, all binary strings of the inline tree can include all of the selected filter criteria fields, so that all of the binary strings at each level present in the hierarchy are the same length (i.e., all of the Ax binary strings are the same length, all of the Bxy binary strings are the same length, all of the Cxyz binary strings are the same length, and so on). Each of the binary strings (except for the lowest level binary strings, which include one so-called "sentinel" index, as explained further in the '654 application), include only the corresponding selected filter criteria data fields (or no fields at all, if it happens that no fields at a particular level of the hierarchy are made available for filtering). In some examples, the clump header table or the inline tree can include fields or strings indicating numbers of records, numbers of strings, locations of or offsets between certain strings, or other indicators for guiding searching or filtering operations through the data structure (discussed in more detail in the '654 application). Such indicators can be advantageous for facilitating skipping of strings, fields, or records during a search or filter operation, when, e.g., to avoid interrogating all of the strings of a given clump if that clump is found not to meet selected filter criteria.

There can be null fields in the inline tree structure, which in some instances would be considered undesirable (as in the '063 and '326 applications). However, in many instances at most one or two dozen or so data fields (or even just a handful) are selected as available filter fields (out of more than, e.g., 100+ fields per address and 20+ fields per voter in the voter dataset). Also, it is often but not necessarily the case that those fields selected for filtering are less likely to be empty in any given data record. The size reduction of the inline tree that results from excluding a substantial fraction of the data fields from the inline tree (as in the '654 application) is much larger than space taken up by null fields within the inline tree.

In one example using the voter database, the size of the inline tree can be reduced from about 160 MB (for the inline tree arranged according to the inline tree applications that includes about 100 fields per record, about 90 of which are clumped) to about 40-50 MB (for an inline tree arranged according to the present disclosure or appended claims that includes about 100 fields per record, about 90 of which are clumped and the remainder of which are filterable). In another example, U.S. census data representing over 270 million people can be divided into about 65,000 clumps (state, county, census tract), about 5 million geographic points, and about 114 million records (including age, gender, ethnicity). Arranging that data into an inline tree structure as shown in FIG. 7 results in a structure well below 1 gigabyte in size.

Figure 7:
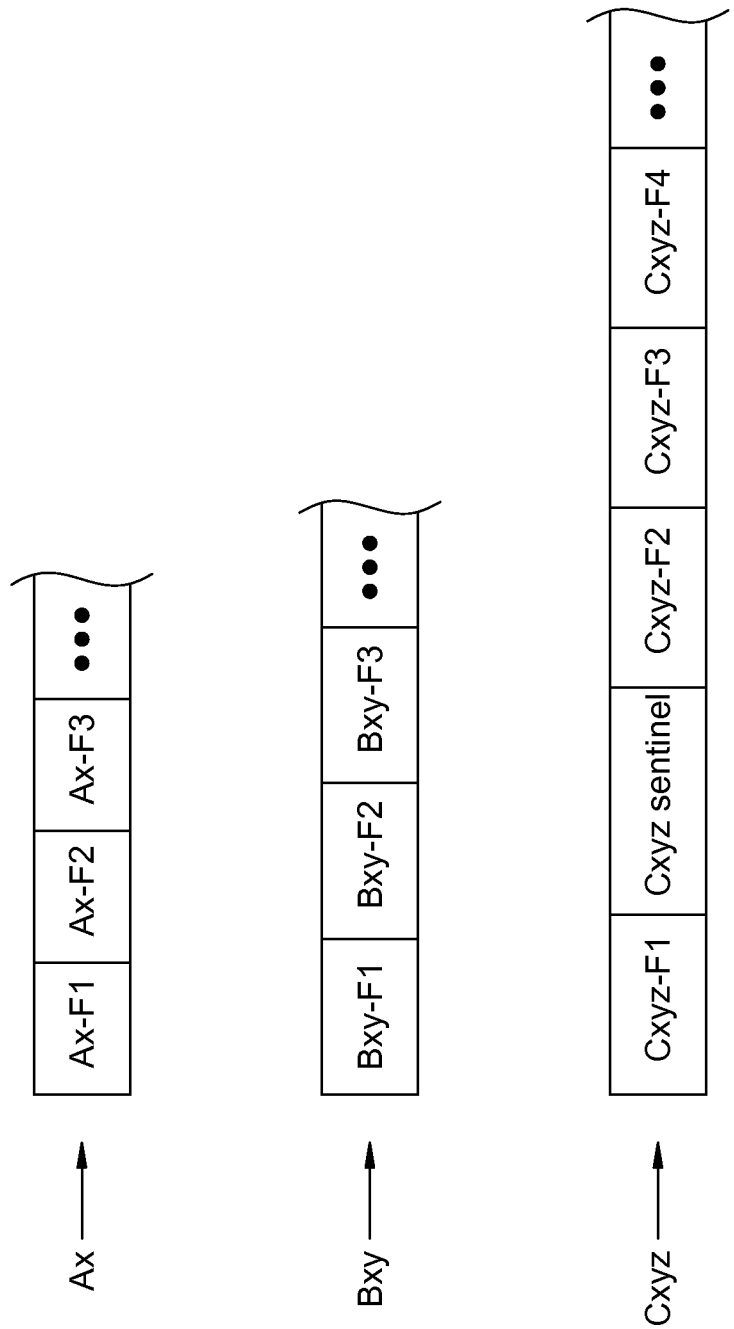
FIG. 7 illustrates schematically an exemplary arrangement of binary data strings in the inline tree data structure of FIG. 4.

FIG. 7 illustrates schematically details of exemplary binary strings Ax, Bxy, and Cxyz of an inline tree data structure arranged according to the disclosure of the '654 application (and shown generically in FIG. 4). To generate such an inline tree data structure, the data fields (i.e., data attributes) of the dataset are divided into three categories before generating the inline tree. The first category of data attributes are those that are selected for attribute clumping, as described above. Such attribute clumping leads to significant size reduction of the inline tree data structure, and also readily enables a search of the dataset filtered according to any combination of those clumped attributes. For any combination of filter criteria within the clumped attributes, each clump is checked against the selected filter criteria. If a given clump does not match the selected criteria, it can be skipped entirely without further searching. Due to the relatively small number of clumps (e.g., about 7000 clumps for the voter dataset of about 1.9 million voter records; about 65,000 clumps for the U.S. census data of about 270 million people), conventional storage and searching of the clump table (can also be also referred to as a "clump header file") can be employed while still enjoying the speed gains enabled by searching the inline tree data structure.

Of the remaining data attributes (i.e., the "non-clumped" attributes), a second category comprises a subset of those attributes for which search filtering will be made available to an end user of the dataset. Those selected fields or attributes can be designated as "non-clumped, filterable," and only those data fields are incorporated into the inline tree data structure of FIG. 7 (typically using string indexing, as described above). The third category comprises all remaining attributes, which can be designated as "non-clumped, non-filterable." Those can be stored in any suitable or conventional fashion, and need not be as readily available for searching or filtering. The "non-clumped, non-filterable" field values typically would only be accessed if a listing of search results were desired (instead of an enumeration only); such a listing of data records is inherently slow and does not necessarily benefit much from the inline tree data structure in any case. If desired, however, the "non-clumped, non-filterable" fields can be stored in an inline tree structure for convenience or for consistency with storage of the filterable non-clumped fields.

It should be noted that, in the registered voter example dataset, the "street" designations (i.e., the Ax nodes) do not typically correspond to entire physical streets. To facilitate compression of the data using clumping, each physical street can be divided into segments so that each segment falls within only a single geographic clump. When a "street" is referred to as a level in the hierarchical dataset, it is actually these street segments that are referred to.

The attribute clumping described above is not restricted to geographically constrained, address-related attributes. Any attributes of a given data record can be advantageously clumped in a similar manner, if there is a sufficiently high degree of correlation or anti-correlation between specific field values in the corresponding fields. For example, in a dataset pertaining to recorded music, certain artists are unlikely to perform in certain genres (e.g., unlikely to have "Philharmonic" and "heavy metal" in the same data record). In another example, in a dataset pertaining to sales, purchasers of certain products might be quite likely to purchase certain other products (e.g., purchasers of camping gear are likely to also purchase hiking boots).

A single clump encompassing all data records (i.e., no attributes clumped) results in no reduction in size of the data structure; one data record per clump (i.e., all attributes clumped) also results in no size reduction. Between those extremes, one or more optimum subsets of attributes can be found for minimizing the size of the stored data structure using clumping, and various suitable subsets of attributes can be employed for significantly reducing the size of the data structure. Use of such optimum or suitable subsets to reduce the size of the inline tree data structure by clumping shall fall within the scope of the present disclosure or appended claims. The choice of which attributes to clump together depends on the nature of the particular dataset, and the degree of correlation (or anti-correlation) between field values in the corresponding data fields. A certain amount of trial and error may be required for finding a suitable subset of attributes to clump to achieve a needed or desired reduction in the size of the data structure. It is typically but not necessarily the case that clumping is most advantageous when it includes only attributes specific to only the first-level subsets of the data records in a hierarchical dataset (e.g., only address-specific fields in the registered voter example, or only the fields Ax-Fi in the generic example of FIG. 4). It should be noted that attribute clumping can be implemented to reduce the size of data structures other than the inline tree data structure of FIG. 4. In particular, attribute clumping can be employed (alone or in combination with other size-reducing techniques, including those disclosed herein) to reduce the size of an inline data structure that is not necessarily arranged according to a hierarchical tree organization scheme, or to reduce the size of a conventional flat file or relational database, or other data structure.

The inline tree data structure of FIG. 4 differs profoundly from the conventional data structures of FIGS. 2 and 3 in several important ways. The use of string indexing and clumping, and field masks (if arranged according to the '063 and '326 applications), allow for significant reduction of the size of the stored data structure, often by a factor of 10 or more. For example, the Oregon registered voter dataset (about $1.6 \times 10^6$ voters with up to about 25 attributes each at about $10^6$ addresses with up to about 100 attributes each) can be stored in an inline tree data structure in about 40-50 MB if arranged as in FIG. 7. A flat file database storing the same data is about 1.5 GB, and a relational database storing that data is about 3 GB (varying depending on the number of different search indices set). Another reason for the size reduction is the substantial lack of so-called "overhead" in the binary file in which the inline tree data structure is stored. In a conventional flat file or relational database, at least one overhead byte is required for each alphanumeric string that is stored. In addition, additional storage is required to store the underlying table structure and relations of a relational database, even before fields of those tables are populated. In contrast, the binary file is just a string of bytes that are not recognizable as a dataset until "decoded" by a search program specifically tailored to the inline tree data structure. Note that a similarly tailored "conversion" program is required to generate the inline tree data structure.

One reason the size reduction is significant is that it enables the entire dataset to be loaded into RAM on a computer or server having reduced memory requirements. The entire 50 MB inline tree data structure can be readily loaded into a computer or server with an relatively ordinary 4 to 8 GB of RAM without significantly burdening the system, whereas the conventional flat file or relational database version of the dataset would severely tax such a system (if it could be loaded at all—a 3 GB database loaded into a 4 GB machine would leave scant resources for the operating system and other vital computer functions). On the other hand, the comparatively small size of the inline tree data structure can enable much larger datasets (e.g., $10^8$ voters) to be loaded entirely into RAM in high-end machines having 32 or 64 GB of RAM, wherein the equivalent conventional flat file or relational database simply could not be loaded entirely into RAM on any currently practicable computer or server. Even as hardware capabilities increase, the inline tree data structure will always enable use of a less powerful, less expensive machine to search a dataset of a given size, or searching of a larger dataset, or more and faster searches of a given dataset, using a machine of a given memory size and processor speed.

The size reduction of the data structure is desirable in its own right, as it enables datasets of a given size to be handled by smaller, less powerful computing devices, enables computing devices of given size and power to handle larger datasets, enables faster loading or rebooting of the dataset, or reduces time or cost associated with transmitting, reading, writing, or storing the dataset. Those benefits of size reduction can be realized to varying degrees by applying one or more of the techniques disclosed herein to any suitable data structure, including the inline tree data structure disclosed herein, an inline data structure that is not necessarily arranged according to a hierarchical tree organization scheme, a conventional flat file or relational database, or other data structure. Using the techniques disclosed herein in combination, the reduced data structure size typically can be less than about 5 bytes per field per record or less than about 3 bytes per field per record, often less than about 2 bytes per field per record (e.g., a dataset of one million records having 100 fields each can be stored in less than about 200 MB), or sometimes less than about 1 byte per field per record (e.g., a dataset of one million records having 100 fields each can be stored in less than about 100 MB). Contrast those sizes with 20 to 40 bytes per field per record often required for conventional data structures.

The profoundly reduced size of the inline tree data structure does not come without a cost, however. Flat file and relational databases excel in their flexibility, enabling ready addition, deletion, or modification of data records in the dataset, often in real time while the database is "live." A wide variety of search, sort, filter, and retrieval functions can be readily implemented, adapted, or modified, for example using standardized Structured Query Language (SQL). However, as already discussed above, such conventional data structures quickly become impractically slow when they contain large numbers of individual data records. "Large" can mean $10^6$ records or more in some instances, or may mean as few as $10^5$ data records or even only $10^4$ data records in other instances.

The inline tree data structure, on the other hand, cannot be readily modified; if the underlying dataset changes, the inline tree data structure typically must be generated anew by the dedicated conversion program (a relatively slow process). A separate "update" or "override" file or table can be appended to or used with the inline tree data structure, but significantly degrades search and filter speed as it accumulates data records and is therefore not an optimal solution. The inline tree data structure is specifically arranged and optimized to perform a basic task—extremely rapid, filtered search of the data records in a large dataset, for listing or (more typically) enumeration. Particular data records cannot be randomly accessed or addressed within the inline tree data structure, nor can SQL be used to formulate queries. However, the inline tree data structure can be traversed by a customized search program extremely rapidly, during which a running list or count is kept of those data records matching one or more specified filter criteria. The intermixing of differing data field types within a single inline structure (e.g., the Ax-Fi, Bxy-Fi, and Cxyz-Fi fields all in the same inline structure) is quite unusual and counterintuitive to most database engineers, but that intermixing in part enables the high-speed filtering of the large dataset. That search program is specifically tailored and adapted to the specific arrangement of the inline tree data structure, as is described further below, and the speed of the search is facilitated by the specific arrangement of the binary strings that represent the data records. The available filtering is dictated in part by the clumping and indexing, and field masking (if present), described above. Differing searches or differing filtering capabilities can require (i) a different inline tree data structure to be generated (using a different, dedicated conversion program) from the same underlying data records and (ii) a different, dedicated search program to be employed. Once generated, the inline tree data structure cannot be readily modified or added to. If the underlying data records are modified or updated, an entirely new inline tree data structure is typically generated to incorporate those changes.

A customized binary file generation process is needed to convert a dataset from a conventional data structure (e.g., flat file or relational database) into an inline tree data structure. In contrast to the high-speed search program, the conversion program is typically quite slow, taking on the order of 10 minutes to process $10^6$ data records. However, that conversion process is performed only infrequently (e.g., to update the data) compared to the frequency of the search and filter process (e.g., many times per minute if data is being visualized and manipulated on a map, as described below). A suitable conversion process typically is embodied as a computer program operating on one or more computers, computer systems, or servers, which include one or more processors and include or are otherwise operatively coupled to one or more computer-readable media of any suitable type. Any suitable hardware or hardware-plus-software implementation can be employed for performing the conversion process, which includes: (i) receiving from a first computer-readable storage medium the electronic dataset comprising a multitude of alphanumeric data records arranged according to a conventional data structure; and (ii) using one or more computer processors programmed therefor and operatively coupled to the first storage medium, generating and storing electronic indicia of the dataset on a second computer-readable storage medium operatively coupled to the one or more computer processors, wherein the electronic indicia include an alphanumeric or binary clump header table and an inline tree data structure as described above.

The generated and stored data structure can also include a string table and any needed or desired supplementary tables as described above, and the generation process can include, inter alia, analyzing the original dataset and extracting a list of all occurring strings, assigning indices to the strings, writing indicia of the strings and the corresponding indices in string or supplementary tables, analyzing the data fields to determine combinations of data fields suitable for clumping, identifying the clumps that occur in the dataset, assigning clump indices, or writing indicia of the clumps and the corresponding indices into a clump table (i.e., a clump header file). It should be noted that the string table or supplementary tables are used primarily during the dataset conversion process, for translating requested search filters prior to a search, or for providing a list of retrieved data records (e.g., actual names and addresses of voters meeting the filter criteria). Those ancillary tables typically are not needed or accessed during the actual search process; the clump header table and the inline tree structure are interrogated during search and filter processes.

A suitable search or filtering process typically is embodied as a computer program operating on one or more computers, computer systems, or servers, which include one or more processors and include or are otherwise operatively coupled to one or more computer-readable media of any suitable type. The computers, systems, or servers that perform the search or filtering functions need not be, and often are not, the same as those that performed the data conversion process. In both cases (convert and search/filter), the computer, server, or system can be a stand-alone machine or can comprise one or machines connected by a local- or wide-area network (LAN or WAN) or the Internet. Any suitable hardware or hardware-plus-software implementation can be employed for searching or filtering, which includes: (a) receiving an electronic query for data records, or an enumeration thereof, having data strings in one or more of the first data fields that fall within a corresponding specified search subranges for those data fields; (b) in response to the query of part (a), with a computer processor programmed therefor and linked to the computer-readable medium, automatically electronically interrogating the clump header table to identify one or more clump data records that correspond to data strings in specified clump data fields that fall within the specified filter subranges according to the query of part (a); (c) automatically electronically interrogating, with a computer processor programmed therefor and linked to the computer-readable medium, those first-level binary string segments indicated by the clump data records identified in part (b), to identify one or more first-level binary string segments that indicate one or more data records that have data strings in specified filterable data fields within the specified filter subranges according to the query of in part (a); (d) automatically electronically interrogating, with a computer processor programmed therefor and linked to the computer-readable medium, those second-level binary string segments corresponding to the first-level binary string segments identified in part (c), to identify one or more second-level binary string segments that indicate one or more data records in specified filterable data fields that have data strings within the specified filter subranges according to the query of part (a); and (e) automatically generating, with a computer processor programmed therefor, a list or an enumeration of one or more data records that correspond to the clump data records identified in part (b), the first-level binary strings segments identified in part (c), or the second-level binary strings identified in part (d).

Data fields in the original dataset are selected for determining a suitable hierarchical arrangement for the data structure. In some instances, a suitable choice will be readily apparent, e.g., if the original dataset is arranged in a series of data tables arranged as a series of one-to-many relationships (as in FIG. 3). In other instances, several choices for a suitable hierarchy might be possible, and one might be selected on the basis of the nature of searches to be performed (e.g., choosing streets as the highest level nodes in the voter data example lends itself to geographic searching or filtering). In an exemplary sales dataset, organizing the dataset with customers as the highest-level nodes might facilitate searching and filtering based on customer-related data fields, while organizing the dataset with products as the highest-level nodes might facilitate searching or filtering based on product-related data fields. Once the hierarchy is selected and defined, data fields not assigned to clumps are assigned to corresponding levels in the hierarchy, and field masks are defined for each level of the hierarchy.

The "selecting," "defining," and similar steps are performed by suitably adapting the dataset conversion program to arrange the inline tree data structure in the desired way. That can be done by direct manual alteration of the conversion program, by indirect alteration of the conversion program using a suitably adapted graphical or text user interface, or by automated alteration of the conversion program based on an automated analysis of the original dataset.

With a suitably adapted conversion program, the original dataset typically is read from a computer-readable medium and processed to produce the corresponding inline tree data structure and its accompanying tables (e.g., string, supplementary, clump header). The conversion program works its way through the original, conventional data structure, e.g., to read the alphanumeric strings from the original data fields and store the corresponding binary indices in sequence in the inline tree or to determine to which clump a data record belongs and to store in the corresponding clump data record an indicator of the corresponding location of binary indicia in the inline tree. The clump header, string, and any supplementary tables, and one or more binary data files embodying the inline tree data structure, can be stored on any suitable computer-readable medium as it is generated or after it is generated. In many instances such binary data are stored on a hard drive or other persistent storage medium, where they are ready to be loaded into RAM or other medium directly accessible to the computer processor that performs the searching and filtering. In preparation for searching, the binary data are loaded into RAM in its entirety, as described above, where it can be accessed and retrieved into the processor's caches or registers as described above. The binary data can be loaded into RAM "on demand" (i.e., in response to a search request) or preferably can reside in RAM in anticipation of one or more subsequent search requests.

As noted above, the conversion from a conventional data structure to the inline tree data structure of the inline tree applications sacrifices flexibility and editability for search and filter speed. An alteration of the data generally requires generation of a new inline tree data structure. In addition, the inline tree data structure of the '654 application achieves further size reductions and speed gains, by sacrificing flexibility in choosing filter criteria for searching. Any combination of filter criteria can be applied to the inline tree structure of the '063 and '326 applications, because all data fields are represented in the clump table or in the inline tree. In contrast, non-clumped data fields that are not selected to be available for filtering are omitted from the inline tree structure of the '654 application; they are essentially "invisible" to search and filter programs described below. Using such a program, a user can choose among the clumped or selected data fields for filtering a search, but cannot choose to filter on a field that is not included in a clump or in the inline tree structure. To enable filtering on such a non-selected data field, new clumps or new selections must be made, and a new clump table generated or a new inline tree data structure generated, to make a previously non-clumped, non-filterable data field available for filtering (either as part of a clump or as part of the inline tree). It should be noted that, in some instances, filtering based on data fields that are not represented in the inline tree data structure can be performed in conjunction with searching and filtering the inline tree itself. Such hybrid searching and filtering can impose a significant speed penalty (due to the need to repeated access an additional data structure).

In the course of using an inline tree data structure, there can arise circumstances in which it would be desirable to alter or replace the contents of certain data fields, or add additional data fields, for some or all of the data records in a dataset. One can of course "go back to the drawing board" and develop a new generating program, use that program to create a new inline tree data structure, and develop and use a new search and filter program for processing the inline tree data structure. However, it may be desirable in certain circumstances to enable such replacement, alteration, or addition of certain data fields without disturbing the inline tree data structure. In one example of such circumstances, it may be the case that certain few data fields might change more frequently than many other data fields, e.g., in the voter registration dataset, an indicator of whether a given voter voted in the most recent election may change with each passing election. In another example, a third-party user of the dataset might have his own additional data fields to append to the dataset, e.g., a candidate licensing voter registration data may wish to append records of campaign donations or home visits by canvassers. In another example, certain filtering operations might be accelerated by additional data fields not present in the original dataset, e.g., in a set of geographically-linked data records, one or more fields indicating multiple subdivided polygons overlaid on a map (recursively subdivided rectangles disclosed in the inline tree applications, for example) can facilitate filtering of the data records according to geographical boundaries or constraints.

The additional data fields can be represented by electronic indicia in one or more auxiliary data structures that are linked to the clump header table in a manner similar to the linkage between the clump header table and the inline tree data structure. Each clump data record (FIG. 6B) includes a tree locator field that indicates a location within the inline tree data structure (FIG. 4) where the corresponding binary string segments begin that encode the non-clumped, filterable data fields of each clump. An auxiliary data structure can comprise (i) an auxiliary locator table that includes an auxiliary locator field (as illustrated schematically in FIG. 8A; can also include a clump identifier as shown, although that is not strictly necessary), and (ii) electronic indicia representing data strings for a set of auxiliary data fields for one or more of the data records of the dataset. The electronic indicia can comprise a set of auxiliary binary string segments, an auxiliary inline tree data structure, or a set of auxiliary alphanumeric string segments, and can also include any ancillary tables or files needed or desired (similar to those described above for the main inline tree data structure and its ancillary tables or files).

To search and filter the dataset and the auxiliary data structure, a suitably adapted search and filter program scans the clump header table as before to identify clumps that fall within selected filter criteria, and proceeds to interrogate the corresponding binary string segments within the inline tree data structure as before to identify data records that fall with selected filter criteria. In addition, the search program also scans the auxiliary locator table(s) in parallel with scanning the clump header table. When a clump is identified that satisfies selected filter criteria, the auxiliary locator field(s) for that identified clump are used to direct the search and filter program to interrogate the corresponding portions of the corresponding auxiliary data structure (whether binary strings, an inline tree, or alphanumeric strings). Data records having auxiliary data fields falling within selected filter criteria are identified as such for enumeration or listing. Note that the parallel interrogation of the clump header and auxiliary locator tables can remain "in step" without those tables necessarily including a clumpID field; such a field can be included anyway if needed or desired.

In some examples there may be fewer auxiliary data fields than those encoded by the main inline tree data structure (in some cases only one additional field), so that those auxiliary data fields can be encoded in a variety of ways (e.g., binary strings, alphanumeric strings, or inline tree) without necessarily increasing the overall size of the data structure to an unacceptable degree, or without necessarily slowing the search and filter process to an unacceptable degree. In some other examples, the auxiliary data fields may be sufficiently numerous so that binary strings or an inline tree are necessary to keep size and speed within acceptable limits. In one example, a set of auxiliary alphanumeric string segments can be employed, with each successive auxiliary alphanumeric string segment interrogated in parallel with interrogation of corresponding binary string segments of the main inline tree structure. In another example, a set of auxiliary binary string segments can be employed (and defined by a corresponding auxiliary string table, as described previously), with each successive auxiliary binary string segment interrogated in parallel with interrogation of corresponding binary string segments of the main inline tree structure. In still another example, in which the auxiliary data is more numerous or hierarchically organized, an auxiliary inline tree data structure can be employed, for example, with each successive set of first- and second-level auxiliary binary string segments interrogated in parallel with interrogation of corresponding binary string segments of the main inline tree structure. In any of those examples, for any clump identified as satisfying selected filter criteria, interrogation of the data structure passes back and forth between corresponding segments of the main inline tree and the auxiliary data structure.

The one or more auxiliary data structures can be advantageously employed in a variety of ways for a variety of reasons. Enabling alteration, replacement, or addition of data fields has already been described above. In another example, data fields that a frequently selected for filtering can be encoded in the main inline tree structure, while fields less frequently selected for filtering can be relegated to an auxiliary data structure. For a requested search and filter operation involving only those fields in the main inline tree structure, processing of the dataset could be significantly faster, because the auxiliary data structure and all of its fields need never be accessed. Filterable data fields can be sorted into several different hierarchies based on observations of how frequently each field is requested to be filtered. In the voter example, age, gender, or political party could be selected in a majority of search/filter requests, while education, income, or religion might be selected less frequently; separating those fields into the main and auxiliary data structures can speed up a majority of requested search/filter operations.

For simple auxiliary data structures, e.g., all of the fields on the same level of the hierarchical data structure depicted in FIG. 1, the strings of the auxiliary data structure for each data record can be made a uniform length, and null strings can be included for those data records lacking an entry for a given auxiliary data field. In that way, as successive binary string segments are scanned in the main inline tree data structure for each data record within a given clump, scanning of the corresponding auxiliary strings remains "in step." For the next identified clump, the auxiliary locator field for that clump directs scanning of the auxiliary data structure to the correct starting location, and subsequent scanning of records of that clump again remain "in step." This process is repeated until all clump header records have been filtered and all clumps meeting the filter criteria have been scanned. If the auxiliary data structure includes a more complex set of data fields, the auxiliary data structure would typically reflect that complexity, e.g., the auxiliary data structure could comprise an inline tree structure that parallels the organization of the main inline tree and would typically include analogous number, length, offset, or position indicators to guide a search/filter operation.

Instead of a separate auxiliary locator table (FIG. 8A), the records in the clump header table can be adapted ahead of time to indicate corresponding locations within the auxiliary data structure. The adaptation can merely include a field for each clump that indicates how many data records are represented by all preceding clumps in the clump header table (illustrated schematically in FIG. 8B, which closely resembles FIG. 6 with the addition of the "cum rec#" field). During the search and filter process, when a clump header record is identified that meets selected filter criteria, the number of preceding data records is used to direct the search and filter program to the correct position in the auxiliary data structure (again assuming that the length of each segment of the auxiliary structure is the same for all data records in the dataset). Once filtering proceeds in the main inline tree structure for an identified clump, filtering of the auxiliary strings remains "in step" through that clump.

One or more auxiliary data structures have been described above that can be employed in conjunction with data structures disclosed in the '654 application. However, one or more auxiliary data structures can also be employed in conjunction with data structures disclosed in the '063 and '326 applications. In those cases, each auxiliary data structure would typically include suitable number, length, offset, or position indicators to guide a search/filter operation through the auxiliary structure in parallel with the main inline tree data structure.

After reading or otherwise receiving from a computer-readable storage medium a first electronic indicia of a dataset, a method comprises, using one or more computer processors programmed therefor and operatively coupled to the first storage medium, generating second electronic indicia of the dataset. The dataset comprises a multitude of alphanumeric data records; each data record includes data strings for multiple corresponding defined data fields. The second electronic indicia comprise (i) an alphanumeric or binary clump header table comprising a plurality of clump data records, (ii) an inline tree data structure, and (iii) one or more auxiliary data structures. The method further comprises storing the clump header table, the inline tree data structure, and the one or more auxiliary data structures on a computer-readable storage medium operatively coupled to the one or more computer processors. If needed or desired, portions of the generating program pertaining to the one or more auxiliary data structures can be isolated from other portions of the generating program, e.g., as one or more subroutines, to facilitate adaptation of the generating program to differing auxiliary data structures. If needed or desired, portions of the generating program pertaining to the one or more auxiliary data structures can be performed separately from other portions of the generating program, e.g., performed at a different time or using a different processor or computer system.

First and second sets of the one or more data fields among the defined data fields define a hierarchical tree relationship among subranges of data strings of the data fields of the first and second sets. The subranges correspond to first-level and second-level subsets, respectively, of the data records of the dataset. The inline tree data structure comprises a sequence of (i) multiple first-level binary string segments, each followed by (ii) a subset of one or more corresponding second-level binary string segments. Each first-level binary string segment encodes a subrange of data strings in a selected filterable subset of the first set of data fields of a corresponding one of the first-level subsets of the data records, and excludes a non-filterable subset of the first set of data fields. Each second-level binary string segment encodes a subrange of data strings in a selected filterable subset of the second set of data fields of a corresponding one of the second-level subsets of the data records, and excludes a non-filterable subset of the second set of data fields. Each first-level binary string segment and one or more corresponding second-level binary string segments can form a substantially contiguous portion within the inline tree data structure.

For a clumped set of the defined data fields, which excludes data fields of the first and second sets, each combination of specific data strings that occurs in the dataset is indicated by a corresponding one of the plurality of clump data records of the clump header table. Each clump data record in the clump header table includes an indicator of a location in the inline tree data structure of a corresponding first-level binary string segment.

Each of the one or more auxiliary data structures comprises electronic indicia of a corresponding auxiliary set of data fields, which in turn comprises (i) one or more of the defined data fields or (ii) one or more additional data fields that are not among the defined data fields. The electronic indicia of each auxiliary data structure comprise a corresponding set of auxiliary binary string segments, a corresponding auxiliary inline tree data structure, or a corresponding set of auxiliary alphanumeric string segments, or combinations. The electronic indicia can include suitable number, length, offset, or position indicators to guide a search/filter operation through the auxiliary data structure in parallel with the main inline tree data structure.

A third set of the one or more data fields among the defined data fields can define a hierarchical tree relationship among subranges of data strings of the data fields of the first, second, and third sets. Those subranges can correspond to first-level, second-level, and third-level subsets, respectively, of the data records of the dataset. The inline tree data structure can further comprises a subset of one or more corresponding third-level binary string segments following each second-level binary string segment. Each third-level binary string segment can encode the range of data strings in the third set of data fields of a corresponding one of the third-level subsets of the data records. Each second-level binary string segment and one or more corresponding third-level binary string segments can form a substantially contiguous portion within the inline tree data structure.

The method can further comprise altering stored electronic indicia of at least one of the one or more auxiliary data structures. The altering of stored electronic indicia of the auxiliary data structure can be performed without altering the clump header table or the inline tree data structure. At least a portion of the electronic indicia of the altered auxiliary data structure can correspond to altered data strings in one or more of the defined data fields of the corresponding auxiliary set, to replacement data strings for one or more of the defined data fields of the corresponding auxiliary set, or to data strings for one or more additional data fields (not among the defined data fields) of the corresponding auxiliary set.

Figure 8A:
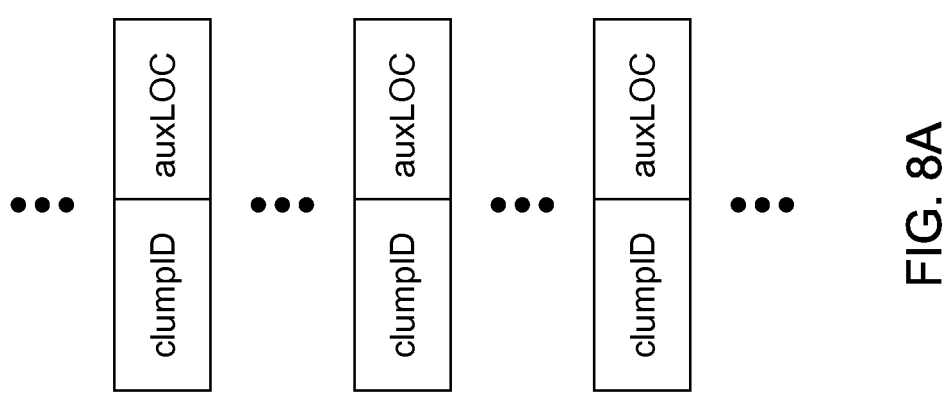
FIG. 8A illustrates schematically an auxiliary locator table of an auxiliary data structure.

At least one of the one or more auxiliary data structures can include an auxiliary clump header table, wherein the auxiliary clump header table includes, for each clump data record, an indicator of a location, in the set of auxiliary binary string segments or in the auxiliary inline tree structure, of electronic indicia of the corresponding auxiliary set of data fields of data records of the corresponding first-level subset of data records (e.g., as in FIG. 8A).

Alternatively, each clump data record can include an indicator of a location, in the corresponding set of auxiliary binary string segments or in the corresponding auxiliary inline tree structure, of electronic indicia of the corresponding auxiliary set of data fields of data records of the corresponding first-level subset of data records (e.g., as in FIG. 8B). The corresponding auxiliary inline tree structure or the corresponding auxiliary set of binary string segments can be arranged in an ordered sequence that corresponds to an ordered sequence of arrangement of the first-level or second-level (or other level, if present) binary string segments in the inline tree data structure. In one example, the indicator of the location in the set of auxiliary binary string segments or in the auxiliary inline tree structure can comprise a total number of data records represented by preceding clump data records.

The inline tree data structure can be stored in one or more computer-readable media that are directly accessible to a computer processor, and is typically stored in such a directly accessible medium to be searched or filtered. At least one corresponding set of auxiliary binary string segments or at least one auxiliary inline tree structure can also be stored in one or more computer-readable media that are directly accessible to a computer processor.

A computer system of any suitable type or configuration can be structured and connected to perform any of the preceding methods. An article comprising a tangible medium can encode computer-readable instructions that, when applied to a computer system, instruct the computer system to perform any of the preceding methods. An article comprising one or more tangible computer-readable media can be encoded to store the clump header table, the inline tree data structure, and the one or more auxiliary data structures generated by any of the preceding methods. One or more of the computer-readable media encoded to store the inline tree data structure can be directly accessible to a computer processor. Similarly, one or more of the computer-readable media encoded to store the corresponding set(s) of auxiliary binary string segments or the auxiliary inline tree structure(s) can be directly accessible to a computer processor. One or more of the media directly accessible to the computer processor can comprise random access memory.

A computer-implemented method for searching the clump header table, the inline tree data structure, and the one or more auxiliary data structures stored on one or more computer-readable media can comprise: (a) receiving an electronic query, (b) interrogating the clump header table, (c) interrogating first-level string segments of the inline tree data structure, (d) interrogating second-level string segments of the inline tree structure, (e) interrogating the one or more auxiliary data structures, and (f) generating a list or enumeration of data records identified in parts (b), (c), (d), or (e).

The electronic query is for data records, or an enumeration thereof, having data strings in one or more specified clumped, filterable, or auxiliary data fields that fall within corresponding specified filter subranges for those data fields. The subsequent interrogation steps are performed in response to the query using a computer processor programmed therefor and linked to the computer-readable medium.

The clump header table is automatically electronically interrogated to identify one or more clump data records that correspond to data strings in specified clump data fields that fall within the specified filter subranges according to the query. Those first-level binary string segments indicated by the clump data records thus identified are automatically electronically interrogated to identify one or more first-level binary string segments that indicate one or more data records that have data strings in specified filterable data fields within the specified filter subranges according to the query. Those second-level binary string segments corresponding to the first-level binary string segments thus identified are automatically electronically interrogated to identify one or more second-level binary string segments that indicate one or more data records in specified filterable data fields that have data strings within the specified filter subranges according to the query. The one or more auxiliary data structures are automatically electronically interrogated to identify one or more data records that correspond to data strings in specified auxiliary data fields that fall within the specified filter subranges according to the query.

With a computer processor programmed therefor, a list or an enumeration is automatically generated of one or more data records that correspond to the identified clump data records, the identified first-level binary strings segments, the identified second-level binary strings, or the identified auxiliary data fields. The inline tree data structure can be stored for interrogation in one or more computer-readable media that are directly accessible to one or more of the corresponding computer processors. Similarly, at least one of the one or more auxiliary data structures can be stored for interrogation in one or more computer-readable media that are directly accessible to the corresponding computer processor. If needed or desired, portions of the searching and filtering program pertaining to the one or more auxiliary data structures can be isolated from other portions of the searching and filtering program, e.g., as one or more subroutines, to facilitate adaptation of the generating program to differing auxiliary data structures.

An article comprising a tangible computer-readable medium can be encoded to store electronic indicia of the list or enumeration generated by any of the preceding methods. A computer system of any suitable type or configuration can be structured and connected to perform any of the preceding methods. An article comprising a tangible medium can encode computer-readable instructions that, when applied to a computer system, instruct the computer system to perform any of the preceding methods.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in temporary or permanent storage or in replaceable media, such as by including programming in microcode, machine code, network-based or web-based or distributed software modules that operate together, RAM, ROM, CD-ROM, CD-ft CD-R/W, DVD-ROM, DVD±R, DVD±R/W, hard drives, thumb drives, flash memory, optical media, magnetic media, semiconductor media, or any future tangible, non-transitory storage alternatives. One or more binary data files embodying the inline tree data structure can also be stored on any suitable computer-readable medium, including those listed above, but as disclosed herein the inline tree data structure is preferably loaded entirely into a computer-readable medium that is directly accessible to a computer processor executing a search of the data structure, e.g., a computer random access memory (RAM).

In addition to the preceding, the following examples fall within the scope of the present disclosure or appended claims:

Example 1

A computer-implemented method comprising: (a) receiving from a computer-readable storage medium first electronic indicia of a dataset comprising a multitude of alphanumeric data records, each data record including data strings for multiple corresponding defined data fields; (b) using one or more computer processors programmed therefor and operatively coupled to the first storage medium, generating second electronic indicia of the dataset, the second electronic indicia comprising (1) an alphanumeric or binary clump header table comprising a plurality of clump data records, (2) an inline tree data structure, and (3) one or more auxiliary data structures; and (c) storing the clump header table, the inline tree data structure, and the one or more auxiliary data structures on a computer-readable storage medium operatively coupled to the one or more computer processors, wherein: (d) first and second sets of the one or more data fields among the defined data fields define a hierarchical tree relationship among subranges of data strings of the data fields of the first and second sets, which subranges correspond to first-level and second-level subsets, respectively, of the data records of the dataset; (e) the inline tree data structure comprises a sequence of (1) multiple first-level binary string segments, each followed by (2) a subset of one or more corresponding second-level binary string segments; (f) each first-level binary string segment encodes a subrange of data strings in a selected filterable subset of the first set of data fields of a corresponding one of the first-level subsets of the data records, and excludes a non-filterable subset of the first set of data fields; (g) each second-level binary string segment encodes a subrange of data strings in a selected filterable subset of the second set of data fields of a corresponding one of the second-level subsets of the data records, and excludes a non-filterable subset of the second set of data fields; (h) for a clumped set of the defined data fields, which clumped set excludes data fields of the first and second sets, each combination of specific data strings that occurs in the dataset is indicated by a corresponding one of the plurality of clump data records of the clump header table; (i) each clump data record in the clump header table includes an indicator of a location in the inline tree data structure of a corresponding first-level binary string segment; (j) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (k) the electronic indicia of each one of the one or more auxiliary data structures comprise a corresponding set of auxiliary binary string segments, a corresponding auxiliary inline tree data structure, or a corresponding set of auxiliary alphanumeric string segments.

Example 2

The method of Example 1 wherein each first-level binary string segment and one or more corresponding second-level binary string segments form a substantially contiguous portion within the inline tree data structure.

Example 3

The method of Example 1 further comprising altering stored electronic indicia of at least one of the one or more auxiliary data structures.

Example 4

The method of Example 3 wherein the altering of stored electronic indicia of the auxiliary data structure is performed without altering the clump header table or the inline tree data structure.

Example 5

The method of Example 1 or 3 wherein at least a portion of the electronic indicia of at least one of the one or more auxiliary data structures correspond to altered data strings in one or more of the defined data fields of the corresponding auxiliary set.

Example 6

The method of Example 1 or 3 wherein at least a portion of the electronic indicia of at least one of the one or more auxiliary data structures correspond to replacement data strings for one or more of the defined data fields of the corresponding auxiliary set.

Example 7

The method of Example 1 wherein: (l) a third set of the one or more data fields among the defined data fields define a hierarchical tree relationship among subranges of data strings of the data fields of the first, second, and third sets, which subranges correspond to first-level, second-level, and third-level subsets, respectively, of the data records of the dataset; (m) the inline tree data structure further comprises a subset of one or more corresponding third-level binary string segments following each second-level binary string segment; and (n) each third-level binary string segment encodes the range of data strings in the third set of data fields of a corresponding one of the third-level subsets of the data records.

Example 8

The method of Example 7 wherein each second-level binary string segment and one or more corresponding third-level binary string segments form a substantially contiguous portion within the inline tree data structure.

Example 9

The method of Example 1 wherein at least one of the one or more auxiliary data structures includes a corresponding auxiliary clump header table, wherein the auxiliary clump header table includes, for each clump data record, an indicator of a location, in the corresponding set of auxiliary binary string segments or in the corresponding auxiliary inline tree structure, of electronic indicia of the corresponding auxiliary set of data fields of data records of the corresponding first-level subset of data records.

Example 10

The method of Example 1 wherein each clump data record includes an indicator of a location, in at least one of the corresponding sets of auxiliary binary string segments or in at least one of the corresponding auxiliary inline tree structures, of electronic indicia of the corresponding auxiliary set of data fields of data records of the corresponding first-level subset of data records.

Example 11

The method of Example 10 wherein at least one of the corresponding auxiliary inline tree structures or at least one of the auxiliary sets of binary string segments is arranged in an ordered sequence that corresponds to an ordered sequence of arrangement of the first-level and second-level binary string segments in the inline tree data structure.

Example 12

The method of Example 11 wherein the indicator of the location in each set of auxiliary binary string segments or in each auxiliary inline tree structure comprises a total number of data records represented by preceding clump data records.

Example 13

A computer system structured and connected to perform the method of any of any one of Examples 1-12.

Example 14

An article comprising one or more tangible, non-transitory media encoding computer-readable instructions that, when applied to a computer system, instruct the computer system to perform the method of any one of Examples 1-12.

Example 15

An article comprising one or more tangible, non-transitory, computer-readable media encoded to store the clump header table, the inline tree data structure, and the one or more auxiliary data structures generated by the method of any one of Examples 1-12.

Example 16

The article of Example 15 wherein one or more of the computer-readable media encoded to store the inline tree data structure is directly accessible to a computer processor.

Example 17

The article of Example 15 wherein one or more of the computer-readable media encoded to store at least one of the sets of auxiliary binary string segments or at least one of the auxiliary inline tree structures is directly accessible to a computer processor.

Example 18

The article of one of Examples 16 or 17 wherein one or more of the media directly accessible to the computer processor comprise random access memory.

Example 19

A computer-implemented method for searching the clump header table, the inline tree data structure, and the one or more auxiliary data structures stored on the computer-readable medium of Example 15, the method comprising: (A) receiving an electronic query for data records, or an enumeration thereof, having data strings in one or more specified clumped, filterable, or auxiliary data fields that fall within corresponding specified filter subranges for those data fields; (B) in response to the query of part (A), with a computer processor programmed therefor and linked to the computer-readable medium, automatically electronically interrogating the clump header table to identify one or more clump data records that correspond to data strings in specified clump data fields that fall within the specified filter subranges according to the query of part (A); (C) automatically electronically interrogating, with a computer processor programmed therefor and linked to the computer-readable medium, those first-level binary string segments indicated by the clump data records identified in part (B), to identify one or more first-level binary string segments that indicate one or more data records that have data strings in specified filterable data fields within the specified filter subranges according to the query of in part (A); (D) automatically electronically interrogating, with a computer processor programmed therefor and linked to the computer-readable medium, those second-level binary string segments corresponding to the first-level binary string segments identified in part (C), to identify one or more second-level binary string segments that indicate one or more data records in specified filterable data fields that have data strings within the specified filter subranges according to the query of part (A); (E) in response to the query of part (A), with a computer processor programmed therefor and linked to the computer-readable medium, automatically electronically interrogating the one or more auxiliary data structures to identify one or more data records that correspond to data strings in specified auxiliary data fields that fall within the specified filter subranges according to the query of part (A); and (F) automatically generating, with a computer processor programmed therefor, a list or an enumeration of one or more data records that correspond to the clump data records identified in part (B), the first-level binary strings segments identified in part (C), the second-level binary strings identified in part (D), or the data records identified in part (E).

Example 20

The method of Example 19 wherein the inline tree data structure is stored in one or more computer-readable media that are directly accessible to the computer processor of part (C), (D), or (E).

Example 21

The method of Example 19 wherein at least one of the one or more auxiliary data structures is stored in one or more computer-readable media that are directly accessible to the computer processor of part (C), (D), or (E).

Example 22

An article comprising one or more tangible, non-transitory computer-readable media encoded to store electronic indicia of the list or enumeration generated by the method of any one of Examples 19-21.

Example 23

A computer system structured and connected to perform the method of any one of Examples 19-21.

Example 24

An article comprising one or more tangible, non-transitory media encoding computer-readable instructions that, when applied to a computer system, instruct the computer system to perform the method of any one of Examples 19-21.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer system comprising one or more computer processors and one or more computer-readable non-transitory storage media structured and connected to perform a method comprising:
   (a) generating, from a multitude of alphanumeric data records, using one or more of the computer processors programmed therefor, (1) an alphanumeric or binary clump header table comprising a plurality of clump data records, (2) an inline tree data structure, and (3) one or more auxiliary data structures; and
   (b) storing the clump header table, the inline tree data structure, and the one or more auxiliary data structures on one of the computer-readable storage media,
   wherein:
   (c) the multitude of alphanumeric data records represent a dataset, each alphanumeric data record includes data strings for multiple corresponding defined data fields, and the clump header table, the inline tree data structure, and the one or more auxiliary data structures also represent said dataset;
   (d) first and second sets of the one or more data fields among the defined data fields define a hierarchical tree relationship among subranges of data strings of the data fields of the first and second sets, which subranges correspond to first-level and second-level subsets, respectively, of the data records of the dataset;
   (e) the inline tree data structure comprises a sequence of (1) multiple first-level binary string segments, each followed by (2) a subset of one or more corresponding second-level binary string segments;
   (f) each first-level binary string segment encodes a subrange of data strings in a selected filterable subset of the first set of data fields of a corresponding one of the first-level subsets of the data records, and excludes a non-filterable subset of the first set of data fields;
   (g) each second-level binary string segment encodes a subrange of data strings in a selected filterable subset of the second set of data fields of a corresponding one of the second-level subsets of the data records, and excludes a non-filterable subset of the second set of data fields;
   (h) for a clumped set of the defined data fields, which clumped set excludes data fields of the first and second sets, each combination of specific data strings that occurs in the dataset is indicated by a corresponding one of the plurality of clump data records of the clump header table;
   (i) each clump data record in the clump header table includes an indicator of a location in the inline tree data structure of a corresponding first-level binary string segment;
   (j) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and
   (k) the electronic indicia of each one of the one or more auxiliary data structures comprise a corresponding set of auxiliary binary string segments, a corresponding auxiliary inline tree data structure, or a corresponding set of auxiliary alphanumeric string segments.

2. An article comprising one or more tangible, non-transitory program-storage media encoding computer-readable instructions that, when applied to a computer system comprising one or more programmed electronic processors operatively coupled to one or more computer-readable storage media, instruct the computer system to perform a method comprising:
   (a) generating, from a multitude of alphanumeric data records, using one or more of the computer processors programmed therefor, (1) an alphanumeric or binary clump header table comprising a plurality of clump data records, (2) an inline tree data structure, and (3) one or more auxiliary data structures; and
   (b) storing the clump header table, the inline tree data structure, and the one or more auxiliary data structures on one of the computer-readable storage media,
   wherein:
   (c) the multitude of alphanumeric data records represent a dataset, each alphanumeric data record includes data strings for multiple corresponding defined data fields, and the clump header table, the inline tree data structure, and the one or more auxiliary data structures also represent said dataset;
   (d) first and second sets of the one or more data fields among the defined data fields define a hierarchical tree relationship among subranges of data strings of the data fields of the first and second sets, which subranges correspond to first-level and second-level subsets, respectively, of the data records of the dataset;
   (e) the inline tree data structure comprises a sequence of (1) multiple first-level binary string segments, each followed by (2) a subset of one or more corresponding second-level binary string segments;
   (f) each first-level binary string segment encodes a subrange of data strings in a selected filterable subset of the first set of data fields of a corresponding one of the first-level subsets of the data records, and excludes a non-filterable subset of the first set of data fields;
   (g) each second-level binary string segment encodes a subrange of data strings in a selected filterable subset of the second set of data fields of a corresponding one of the second-level subsets of the data records, and excludes a non-filterable subset of the second set of data fields;
   (h) for a clumped set of the defined data fields, which clumped set excludes data fields of the first and second sets, each combination of specific data strings that occurs in the dataset is indicated by a corresponding one of the plurality of clump data records of the clump header table;
   (i) each clump data record in the clump header table includes an indicator of a location in the inline tree data structure of a corresponding first-level binary string segment;
   (j) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and
   (k) the electronic indicia of each one of the one or more auxiliary data structures comprise a corresponding set of auxiliary binary string segments, a corresponding auxiliary inline tree data structure, or a corresponding set of auxiliary alphanumeric string segments.

3. An article comprising one or more tangible, non-transitory computer-readable data-storage media encoded to store the clump header table, the inline tree data structure, and the one or more auxiliary data structures generated by a method implemented using a computer system comprising one or more programmed electronic processors operatively coupled to one or more computer-readable storage media, the method comprising:

(a) generating, from a multitude of alphanumeric data records, using one or more of the computer processors programmed therefor, (1) an alphanumeric or binary clump header table comprising a plurality of clump data records, (2) an inline tree data structure, and (3) one or more auxiliary data structures; and (b) storing the clump header table, the inline tree data structure, and the one or more auxiliary data structures on one of the computer-readable storage media, wherein:

(c) the multitude of alphanumeric data records represent a dataset, each alphanumeric data record includes data strings for multiple corresponding defined data fields, and the clump header table, the inline tree data structure, and the one or more auxiliary data structures also represent said dataset;

(d) first and second sets of the one or more data fields among the defined data fields define a hierarchical tree relationship among subranges of data strings of the data fields of the first and second sets, which subranges correspond to first-level and second-level subsets, respectively, of the data records of the dataset;

(e) the inline tree data structure comprises a sequence of (1) multiple first-level binary string segments, each followed by (2) a subset of one or more corresponding second-level binary string segments;

(f) each first-level binary string segment encodes a subrange of data strings in a selected filterable subset of the first set of data fields of a corresponding one of the first-level subsets of the data records, and excludes a non-filterable subset of the first set of data fields;

(g) each second-level binary string segment encodes a subrange of data strings in a selected filterable subset of the second set of data fields of a corresponding one of the second-level subsets of the data records, and excludes a non-filterable subset of the second set of data fields;

(h) for a clumped set of the defined data fields, which clumped set excludes data fields of the first and second sets, each combination of specific data strings that occurs in the dataset is indicated by a corresponding one of the plurality of clump data records of the clump header table;

(i) each clump data record in the clump header table includes an indicator of a location in the inline tree data structure of a corresponding first-level binary string segment;

(j) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (k) the electronic indicia of each one of the one or more auxiliary data structures comprise a corresponding set of auxiliary binary string segments, a corresponding auxiliary inline tree data structure, or a corresponding set of auxiliary alphanumeric string segments.

4. The article of claim 3 wherein one or more of the computer-readable data-storage media encoded to store the inline tree data structure is directly accessible to a computer processor.

5. The article of claim 3 wherein one or more of the computer-readable data-storage media encoded to store at least one of the sets of auxiliary binary string segments or at least one of the auxiliary inline tree structures is directly accessible to a computer processor.

6. The article of claim 5 wherein one or more of the data-storage media directly accessible to the computer processor comprise random access memory.

7. A method, implemented using a computer system comprising one or more programmed electronic processors operatively coupled to one or more computer-readable storage media, for searching an alphanumeric or binary clump header table, an inline tree data structure, and one or more auxiliary data structures stored on one or more tangible, non-transitory computer-readable data-storage media operatively coupled to one or more of the one or more programmed electronic processors, wherein the clump header table, the inline tree data structure, and the one or more auxiliary data structures represent a dataset that is also represented by a multitude of alphanumeric data records, the method comprising:

(A) receiving an electronic query for data records, or an enumeration thereof, having data strings in one or more specified clumped, filterable, or auxiliary data fields that fall within corresponding specified filter subranges for those data fields;

(B) in response to the query of part (A), with one or more of the computer processors programmed therefor and linked to the one or more computer-readable data-storage media, automatically electronically interrogating the clump header table to identify one or more clump data records that correspond to data strings in specified clump data fields that fall within the specified filter subranges according to the query of part (A);

(C) automatically electronically interrogating, with one or more of the computer processors programmed therefor and linked to the one or more computer-readable data-storage media, those first-level binary string segments indicated by the clump data records identified in part (B), to identify one or more first-level binary string segments that indicate one or more data records that have data strings in specified filterable data fields within the specified filter subranges according to the query of in part (A);

(D) automatically electronically interrogating, with one or more of the computer processors programmed therefor and linked to the one or more computer-readable data-storage media, those second-level binary string segments corresponding to the first-level binary string segments identified in part (C), to identify one or more second-level binary string segments that indicate one or more data records in specified filterable data fields that have data strings within the specified filter subranges according to the query of part (A);

(E) in response to the query of part (A), with one of the computer processors programmed therefor and linked to the one or more computer-readable data-storage media, automatically electronically interrogating the one or more auxiliary data structures to identify one or more data records that correspond to data strings in specified auxiliary data fields that fall within the specified filter subranges according to the query of part (A); and (F) automatically generating, with one of the computer processors programmed therefor, a list or an enumeration of one or more data records that correspond to the clump data records identified in part (B), the first-level binary strings segments identified in part (C), the second-level binary strings identified in part (D), or the data records identified in part (E), wherein:
- (a) each alphanumeric data record includes data strings for multiple corresponding defined data fields;
- (b) first and second sets of the one or more data fields among the defined data fields define a hierarchical tree relationship among subranges of data strings of the data fields of the first and second sets, which subranges correspond to first-level and second-level subsets, respectively, of the data records of the dataset;
- (c) the inline tree data structure comprises a sequence of (1) multiple first-level binary string segments, each followed by (2) a subset of one or more corresponding second-level binary string segments;
- (d) each first-level binary string segment encodes a subrange of data strings in a selected filterable subset of the first set of data fields of a corresponding one of the first-level subsets of the data records, and excludes a non-filterable subset of the first set of data fields;
- (e) each second-level binary string segment encodes a subrange of data strings in a selected filterable subset of the second set of data fields of a corresponding one of the second-level subsets of the data records, and excludes a non-filterable subset of the second set of data fields;
- (f) for a clumped set of the defined data fields, which clumped set excludes data fields of the first and second sets, each combination of specific data strings that occurs in the dataset is indicated by a corresponding one of the plurality of clump data records of the clump header table;
- (g) each clump data record in the clump header table includes an indicator of a location in the inline tree data structure of a corresponding first-level binary string segment;
- (h) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and
- (i) the electronic indicia of each one of the one or more auxiliary data structures comprise a corresponding set of auxiliary binary string segments, a corresponding auxiliary inline tree data structure, or a corresponding set of auxiliary alphanumeric string segments.

8. The method of claim 7 wherein the inline tree data structure is stored in one or more computer-readable data-storage media that are directly accessible to the computer processor of part (C), (D), or (E).

9. The method of claim 7 wherein at least one of the one or more auxiliary data structures is stored in one or more computer-readable data-storage media that are directly accessible to the computer processor of part (C), (D), or (E).

10. An article comprising one or more tangible, non-transitory computer-readable data-output media encoded to store electronic indicia of a list or enumeration of data records, wherein the list or enumeration is generated by a method, implemented using a computer system comprising one or more programmed electronic processors operatively coupled to one or more computer-readable storage media, for searching an alphanumeric or binary clump header table, an inline tree data structure, and one or more auxiliary data structures stored on one or more tangible, non-transitory computer-readable data-storage media operatively coupled to one or more of the one or more programmed electronic processors, wherein the clump header table, the inline tree data structure, and the one or more auxiliary data structures represent a dataset that is also represented by a multitude of alphanumeric data records, the method comprising:

- (A) receiving an electronic query for data records, or an enumeration thereof, having data strings in one or more specified clumped, filterable, or auxiliary data fields that fall within corresponding specified filter subranges for those data fields;
- (B) in response to the query of part (A), with one or more of the computer processors programmed therefor and linked to the one or more computer-readable data-storage media, automatically electronically interrogating the clump header table to identify one or more clump data records that correspond to data strings in specified clump data fields that fall within the specified filter subranges according to the query of part (A);
- (C) automatically electronically interrogating, with one or more of the computer processors programmed therefor and linked to the one or more computer-readable data-storage media, those first-level binary string segments indicated by the clump data records identified in part (B), to identify one or more first-level binary string segments that indicate one or more data records that have data strings in specified filterable data fields within the specified filter subranges according to the query of in part (A);
- (D) automatically electronically interrogating, with one or more of the computer processors programmed therefor and linked to the one or more computer-readable data-storage media, those second-level binary string segments corresponding to the first-level binary string segments identified in part (C), to identify one or more second-level binary string segments that indicate one or more data records in specified filterable data fields that have data strings within the specified filter subranges according to the query of part (A);
- (E) in response to the query of part (A), with one of the computer processors programmed therefor and linked to the one or more computer-readable data-storage media, automatically electronically interrogating the one or more auxiliary data structures to identify one or more data records that correspond to data strings in specified auxiliary data fields that fall within the specified filter subranges according to the query of part (A); and
- (F) automatically generating, with one of the computer processors programmed therefor, a list or an enumeration of one or more data records that correspond to the clump data records identified in part (B), the first-level binary strings segments identified in part (C), the second-level binary strings identified in part (D), or the data records identified in part (E), wherein:
- (a) each alphanumeric data record includes data strings for multiple corresponding defined data fields;
- (b) first and second sets of the one or more data fields among the defined data fields define a hierarchical tree relationship among subranges of data strings of the data fields of the first and second sets, which subranges correspond to first-level and second-level subsets, respectively, of the data records of the dataset;
- (c) the inline tree data structure comprises a sequence of (1) multiple first-level binary string segments, each followed by (2) a subset of one or more corresponding second-level binary string segments;

(d) each first-level binary string segment encodes a subrange of data strings in a selected filterable subset of the first set of data fields of a corresponding one of the first-level subsets of the data records, and excludes a non-filterable subset of the first set of data fields;

(e) each second-level binary string segment encodes a subrange of data strings in a selected filterable subset of the second set of data fields of a corresponding one of the second-level subsets of the data records, and excludes a non-filterable subset of the second set of data fields;

(f) for a clumped set of the defined data fields, which clumped set excludes data fields of the first and second sets, each combination of specific data strings that occurs in the dataset is indicated by a corresponding one of the plurality of clump data records of the clump header table;

(g) each clump data record in the clump header table includes an indicator of a location in the inline tree data structure of a corresponding first-level binary string segment;

(h) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (i) the electronic indicia of each one of the one or more auxiliary data structures comprise a corresponding set of auxiliary binary string segments, a corresponding auxiliary inline tree data structure, or a corresponding set of auxiliary alphanumeric string segments.

11. A computer system comprising one or more computer processors, one or more tangible, non-transitory computer-readable data-storage media, and one or more tangible, non-transitory computer-readable data-output media structured and connected to perform a method for searching an alphanumeric or binary clump header table, an inline tree data structure, and one or more auxiliary data structures stored on one or more tangible, non-transitory computer-readable data-storage media operatively coupled to one or more of the one or more programmed electronic processors, wherein the clump header table, the inline tree data structure, and the one or more auxiliary data structures represent a dataset that is also represented by a multitude of alphanumeric data records, the method comprising:

(A) receiving an electronic query for data records, or an enumeration thereof, having data strings in one or more specified clumped, filterable, or auxiliary data fields that fall within corresponding specified filter subranges for those data fields;

(B) in response to the query of part (A), with one or more of the computer processors programmed therefor and linked to the one or more computer-readable data-storage media, automatically electronically interrogating the clump header table to identify one or more clump data records that correspond to data strings in specified clump data fields that fall within the specified filter subranges according to the query of part (A);

(C) automatically electronically interrogating, with one or more of the computer processors programmed therefor and linked to the one or more computer-readable data-storage media, those first-level binary string segments indicated by the clump data records identified in part (B), to identify one or more first-level binary string segments that indicate one or more data records that have data strings in specified filterable data fields within the specified filter subranges according to the query of in part (A);

(D) automatically electronically interrogating, with one or more of the computer processors programmed therefor and linked to the one or more computer-readable data-storage media, those second-level binary string segments corresponding to the first-level binary string segments identified in part (C), to identify one or more second-level binary string segments that indicate one or more data records in specified filterable data fields that have data strings within the specified filter subranges according to the query of part (A);

(E) in response to the query of part (A), with one of the computer processors programmed therefor and linked to the one or more computer-readable data-storage media, automatically electronically interrogating the one or more auxiliary data structures to identify one or more data records that correspond to data strings in specified auxiliary data fields that fall within the specified filter subranges according to the query of part (A); and (F) automatically generating, with one of the computer processors programmed therefor, a list or an enumeration of one or more data records that correspond to the clump data records identified in part (B), the first-level binary strings segments identified in part (C), the second-level binary strings identified in part (D), or the data records identified in part (E), wherein:

(a) each alphanumeric data record includes data strings for multiple corresponding defined data fields;

(b) first and second sets of the one or more data fields among the defined data fields define a hierarchical tree relationship among subranges of data strings of the data fields of the first and second sets, which subranges correspond to first-level and second-level subsets, respectively, of the data records of the dataset;

(c) the inline tree data structure comprises a sequence of (1) multiple first-level binary string segments, each followed by (2) a subset of one or more corresponding second-level binary string segments;

(d) each first-level binary string segment encodes a subrange of data strings in a selected filterable subset of the first set of data fields of a corresponding one of the first-level subsets of the data records, and excludes a non-filterable subset of the first set of data fields;

(e) each second-level binary string segment encodes a subrange of data strings in a selected filterable subset of the second set of data fields of a corresponding one of the second-level subsets of the data records, and excludes a non-filterable subset of the second set of data fields;

(f) for a clumped set of the defined data fields, which clumped set excludes data fields of the first and second sets, each combination of specific data strings that occurs in the dataset is indicated by a corresponding one of the plurality of clump data records of the clump header table;

(g) each clump data record in the clump header table includes an indicator of a location in the inline tree data structure of a corresponding first-level binary string segment;

(h) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (i) the electronic indicia of each one of the one or more auxiliary data structures comprise a corresponding set of auxiliary binary string segments, a corresponding auxiliary inline tree data structure, or a corresponding set of auxiliary alphanumeric string segments.

12. An article comprising one or more tangible, non-transitory program-storage media encoding computer-readable instructions that, when applied to a computer system comprising one or more programmed electronic processors operatively coupled to one or more computer-readable storage media, instruct the computer system to perform a method for searching an alphanumeric or binary clump header table, an inline tree data structure, and one or more auxiliary data structures stored on one or more tangible, non-transitory computer-readable data-storage media operatively coupled to one or more of the one or more programmed electronic processors, wherein the clump header table, the inline tree data structure, and the one or more auxiliary data structures represent a dataset that is also represented by a multitude of alphanumeric data records, the method comprising:

(A) receiving an electronic query for data records, or an enumeration thereof, having data strings in one or more specified clumped, filterable, or auxiliary data fields that fall within corresponding specified filter subranges for those data fields;

(B) in response to the query of part (A), with one or more of the computer processors programmed therefor and linked to the one or more computer-readable data-storage media, automatically electronically interrogating the clump header table to identify one or more clump data records that correspond to data strings in specified clump data fields that fall within the specified filter subranges according to the query of part (A);

(C) automatically electronically interrogating, with one or more of the computer processors programmed therefor and linked to the one or more computer-readable data-storage media, those first-level binary string segments indicated by the clump data records identified in part (B), to identify one or more first-level binary string segments that indicate one or more data records that have data strings in specified filterable data fields within the specified filter subranges according to the query of in part (A);

(D) automatically electronically interrogating, with one or more of the computer processors programmed therefor and linked to the one or more computer-readable data-storage media, those second-level binary string segments corresponding to the first-level binary string segments identified in part (C), to identify one or more second-level binary string segments that indicate one or more data records in specified filterable data fields that have data strings within the specified filter subranges according to the query of part (A);

(E) in response to the query of part (A), with one of the computer processors programmed therefor and linked to the one or more computer-readable data-storage media, automatically electronically interrogating the one or more auxiliary data structures to identify one or more data records that correspond to data strings in specified auxiliary data fields that fall within the specified filter subranges according to the query of part (A); and (F) automatically generating, with one of the computer processors programmed therefor, a list or an enumeration of one or more data records that correspond to the clump data records identified in part (B), the first-level binary strings segments identified in part (C), the second-level binary strings identified in part (D), or the data records identified in part (E), wherein:

(a) each alphanumeric data record includes data strings for multiple corresponding defined data fields;

(b) first and second sets of the one or more data fields among the defined data fields define a hierarchical tree relationship among subranges of data strings of the data fields of the first and second sets, which subranges correspond to first-level and second-level subsets, respectively, of the data records of the dataset;

(c) the inline tree data structure comprises a sequence of (1) multiple first-level binary string segments, each followed by (2) a subset of one or more corresponding second-level binary string segments;

(d) each first-level binary string segment encodes a subrange of data strings in a selected filterable subset of the first set of data fields of a corresponding one of the first-level subsets of the data records, and excludes a non-filterable subset of the first set of data fields;

(e) each second-level binary string segment encodes a subrange of data strings in a selected filterable subset of the second set of data fields of a corresponding one of the second-level subsets of the data records, and excludes a non-filterable subset of the second set of data fields;

(f) for a clumped set of the defined data fields, which clumped set excludes data fields of the first and second sets, each combination of specific data strings that occurs in the dataset is indicated by a corresponding one of the plurality of clump data records of the clump header table;

(g) each clump data record in the clump header table includes an indicator of a location in the inline tree data structure of a corresponding first-level binary string segment;

(h) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (i) the electronic indicia of each one of the one or more auxiliary data structures comprise a corresponding set of auxiliary binary string segments, a corresponding auxiliary inline tree data structure, or a corresponding set of auxiliary alphanumeric string segments.

13. A method implemented using a computer system comprising one or more programmed electronic processors operatively coupled to one or more computer-readable storage media, the method comprising:

(a) generating, from a multitude of alphanumeric data records, using one or more of the computer processors programmed therefor, (1) an alphanumeric or binary clump header table comprising a plurality of clump data records, (2) an inline tree data structure, and (3) one or more auxiliary data structures; and (b) storing the clump header table, the inline tree data structure, and the one or more auxiliary data structures on one of the computer-readable storage media, wherein:

(c) the multitude of alphanumeric data records represent a dataset, each alphanumeric data record includes data strings for multiple corresponding defined data fields, and the clump header table, the inline tree data structure, and the one or more auxiliary data structures also represent said dataset;

(d) first and second sets of the one or more data fields among the defined data fields define a hierarchical tree relationship among subranges of data strings of the data fields of the first and second sets, which subranges correspond to first-level and second-level subsets, respectively, of the data records of the dataset;

(e) the inline tree data structure comprises a sequence of (1) multiple first-level binary string segments, each followed by (2) a subset of one or more corresponding second-level binary string segments;

(f) each first-level binary string segment encodes a subrange of data strings in a selected filterable subset of the first set of data fields of a corresponding one of the first-level subsets of the data records, and excludes a non-filterable subset of the first set of data fields;

(g) each second-level binary string segment encodes a subrange of data strings in a selected filterable subset of the second set of data fields of a corresponding one of the second-level subsets of the data records, and excludes a non-filterable subset of the second set of data fields;

(h) for a clumped set of the defined data fields, which clumped set excludes data fields of the first and second sets, each combination of specific data strings that occurs in the dataset is indicated by a corresponding one of the plurality of clump data records of the clump header table;

(i) each clump data record in the clump header table includes an indicator of a location in the inline tree data structure of a corresponding first-level binary string segment;

(j) each of the one or more auxiliary data structures comprises electronic indicia of a corresponding auxiliary set of data fields, which auxiliary set of data fields comprises (1) one or more of the defined data fields or (2) one or more additional data fields that are not among the defined data fields; and (k) the electronic indicia of each one of the one or more auxiliary data structures comprise a corresponding set of auxiliary binary string segments, a corresponding auxiliary inline tree data structure, or a corresponding set of auxiliary alphanumeric string segments.

14. The method of claim 13 wherein each first-level binary string segment and one or more corresponding second-level binary string segments form a substantially contiguous portion within the inline tree data structure.

15. The method of claim 13 further comprising altering stored electronic indicia of at least one of the one or more auxiliary data structures.

16. The method of claim 15 wherein the altering of stored electronic indicia of the auxiliary data structure is performed without altering the clump header table or the inline tree data structure.

17. The method of claim 13 wherein at least a portion of the electronic indicia of at least one of the one or more auxiliary data structures correspond to altered data strings in one or more of the defined data fields of the corresponding auxiliary set.

18. The method of claim 13 wherein at least a portion of the electronic indicia of at least one of the one or more auxiliary data structures correspond to replacement data strings for one or more of the defined data fields of the corresponding auxiliary set.

19. The method of claim 13 wherein:

(l) a third set of the one or more data fields among the defined data fields define a hierarchical tree relationship among subranges of data strings of the data fields of the first, second, and third sets, which subranges correspond to first-level, second-level, and third-level subsets, respectively, of the data records of the dataset;

(m) the inline tree data structure further comprises a subset of one or more corresponding third-level binary string segments following each second-level binary string segment; and (n) each third-level binary string segment encodes the range of data strings in the third set of data fields of a corresponding one of the third-level subsets of the data records.

20. The method of claim 19 wherein each second-level binary string segment and one or more corresponding third-level binary string segments form a substantially contiguous portion within the inline tree data structure.

21. The method of claim 13 wherein at least one of the one or more auxiliary data structures includes a corresponding auxiliary clump header table, wherein the auxiliary clump header table includes, for each clump data record, an indicator of a location, in the corresponding set of auxiliary binary string segments or in the corresponding auxiliary inline tree structure, of electronic indicia of the corresponding auxiliary set of data fields of data records of the corresponding first-level subset of data records.

22. The method of claim 13 wherein each clump data record includes an indicator of a location, in at least one of the corresponding sets of auxiliary binary string segments or in at least one of the corresponding auxiliary inline tree structures, of electronic indicia of the corresponding auxiliary set of data fields of data records of the corresponding first-level subset of data records.

23. The method of claim 22 wherein at least one of the corresponding auxiliary inline tree structures or at least one of the auxiliary sets of binary string segments is arranged in an ordered sequence that corresponds to an ordered sequence of arrangement of the first-level and second-level binary string segments in the inline tree data structure.

24. The method of claim 23 wherein the indicator of the location in each set of auxiliary binary string segments or in each auxiliary inline tree structure comprises a total number of data records represented by preceding clump data records.

* * * * *